US007390259B2

(12) United States Patent
Okada

(10) Patent No.: US 7,390,259 B2

(45) **Date of Patent: *Jun. 24, 2008**

(54) GAMING APPARATUS INCLUDING A VARIABLE DISPLAY, A BACKLIGHT, A REFLECTING COVER TO DIRECTLY ILLUMINATE GAME SYMBOLS, AND A CONTROLLER TO CONTROL THE VARYING OF THE VARIABLE DISPLAY

(75) Inventor: Kazuo Okada, Tokyo (JP)

(73) Assignee: Aruze Corporation, Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 10/602,619

(22) Filed: Jun. 25, 2003

(65) Prior Publication Data

US 2004/0014520 A1 Jan. 22, 2004

(30) Foreign Application Priority Data

Jun. 25, 2002 (JP) ............................ 2002-185048

(51) Int. Cl.

*G06F 17/00* (2006.01)
*G06F 19/00* (2006.01)
*A63B 71/00* (2006.01)
*A63F 1/18* (2006.01)

(52) U.S. Cl. .............................. 463/20; 463/16; 463/17; 463/18; 463/19; 273/138.1; 273/143 R

(58) Field of Classification Search ............. 463/16–20; 273/143 R

See application file for complete search history.

(56) References Cited

U.S. PATENT DOCUMENTS 4,573,681 A * 3/1986 Okada ......................... 463/21
4,772,023 A * 9/1988 Okada .................... 273/143 R
5,074,559 A * 12/1991 Okada ......................... 463/21

(Continued)

FOREIGN PATENT DOCUMENTS

DE 196 14 113 9/1997

(Continued)

OTHER PUBLICATIONS

Machine Translation to English of JP 2000-011725, including abstract, claims, & detailed description.*

*Primary Examiner*—Robert Pezzuto
*Assistant Examiner*—Milap Shah
(74) *Attorney, Agent, or Firm*—Oblon, Spivak, McClelland, Maier & Neustadt, P.C.

(57) ABSTRACT

The gaming apparatus of the present invention comprises a variable display unit configured to variably display a plurality of symbols, a front side display unit located in front of the variable display unit and configured to enable viewing of the symbols displayed by the variable display unit, an internally winning prize determiner configured to determine an internally winning prize, a stopping controller configured to stop the varying of display of the variable display unit based on a result of determination by the internally winning prize determiner, and wherein the front side displaying unit does not display any objects on an area for enabling viewing of the symbols displayed by the variable display unit, and a prize is awarded if a stopped state displayed on the variable display unit, which is caused by the stopping controller, matches a prescribed stopped state.

10 Claims, 35 Drawing Sheets

U.S. PATENT DOCUMENTS

| | | | | | |
|---|---|---|---|---|---|
| 5,083,785 | A | * | 1/1992 | Okada | 463/21 |
| 5,380,008 | A | * | 1/1995 | Mathis et al. | 463/18 |
| 5,472,195 | A | * | 12/1995 | Takemoto et al. | 463/31 |
| 6,517,433 | B2 | * | 2/2003 | Loose et al. | 463/20 |
| 6,817,946 | B2 | * | 11/2004 | Motegi et al. | 463/31 |
| 2001/0031658 | A1 | | 10/2001 | Ozaki et al. | |

FOREIGN PATENT DOCUMENTS

| | | |
|---|---|---|
| JP | 6-142278 | 5/1994 |
| JP | 7-124290 | 5/1995 |
| JP | 2000-11725 | 1/2000 |
| JP | 2000-267604 | 9/2000 |
| JP | 2000-300729 | 10/2000 |
| JP | 2000-350805 | 12/2000 |
| JP | 2001-62032 | 3/2001 |
| JP | 2001-252394 | 9/2001 |
| JP | 2001-305246 | 10/2001 |

* cited by examiner

FIG.6

| | LEFT REEL | | CENTER REEL | | RIGHT REEL |
|---|---|---|---|---|---|
| 00 | RED 7 | 00 | RED 7 | 00 | RED 7 |
| 01 | CHERRY | 01 | PLUM | 01 | BELL |
| 02 | BLUE 7 | 02 | REPLAY | 02 | REPLAY |
| 03 | BELL | 03 | BELL | 03 | BAR |
| 04 | REPLAY | 04 | CHERRY | 04 | PLUM |
| 05 | RED 7 | 05 | REPLAY | 05 | BELL |
| 06 | CHERRY | 06 | CHERRY | 06 | REPLAY |
| 07 | BLUE 7 | 07 | BELL | 07 | CHERRY |
| 08 | BELL | 08 | BAR | 08 | BLUE 7 |
| 09 | REPLAY | 09 | CHERRY | 09 | CHERRY |
| 10 | PLUM | 10 | REPLAY | 10 | BELL |
| 11 | BELL | 11 | BELL | 11 | REPLAY |
| 12 | REPLAY | 12 | BLUE 7 | 12 | CHERRY |
| 13 | BAR | 13 | REPLAY | 13 | PLUM |
| 14 | RED 7 | 14 | CHERRY | 14 | BELL |
| 15 | BELL | 15 | BELL | 15 | REPLAY |
| 16 | PLUM | 16 | BAR | 16 | CHERRY |
| 17 | REPLAY | 17 | PLUM | 17 | BLUE 7 |
| 18 | PLUM | 18 | REPLAY | 18 | BELL |
| 19 | BELL | 19 | BELL | 19 | REPLAY |
| 20 | REPLAY | 20 | CHERRY | 20 | CHERRY |

FIG.7

PRIZES TO BE AWARDED AND THE NUMBER OF MEDALS TO BE PAID OUT CORRESPONDING TO WINNING SYMBOL COMBINATIONS

| SYMBOL COMBINATION | NORMAL GAME STATE | NORMAL GAME STATE IN BB STATE | RB GAME STATE |
|---|---|---|---|
| RED 7-RED 7-RED 7 | BB 15 pc. | – | – |
| BLUE 7-BLUE 7-BLUE 7 | BB 15 pc. | – | – |
| BAR-BAR-BAR | RB 15 pc. | – | – |
| BELL-BELL-BELL | BELL PRIZE 15 pc. | BELL PRIZE 15 pc. | – |
| PLUM-PLUM-PLUM | PLUM PRIZE 6 pc. | PLUM PRIZE 6 pc. | – |
| REPLAY-REPLAY-REPLAY | REPLAY 0 pc. | RB (JAC IN) 15 pc. | 15 pc. |
| CHERRY-ANY-ANY | CHERRY PRIZE 2 OR 4 pc. | CHERRY PRIZE 2 OR 4 pc. | – |

FIG.8

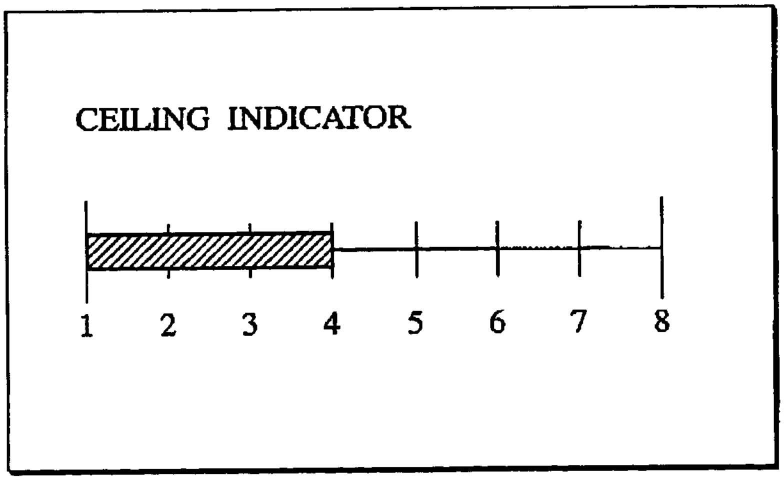

FIG.9
(1) PICTURE NOTIFYING TO PUSH LEFT STOP BUTTON
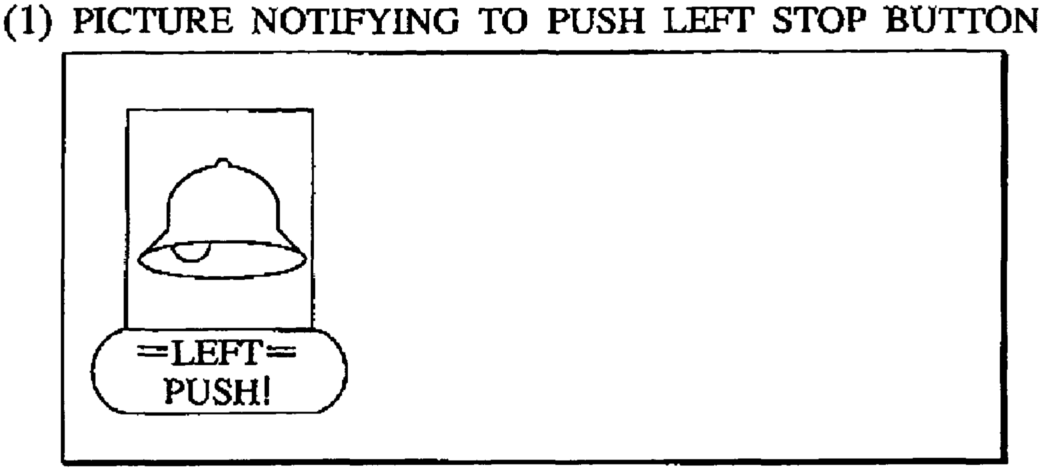
(2) PICTURE NOTIFYING TO PUSH RIGHT STOP BUTTON
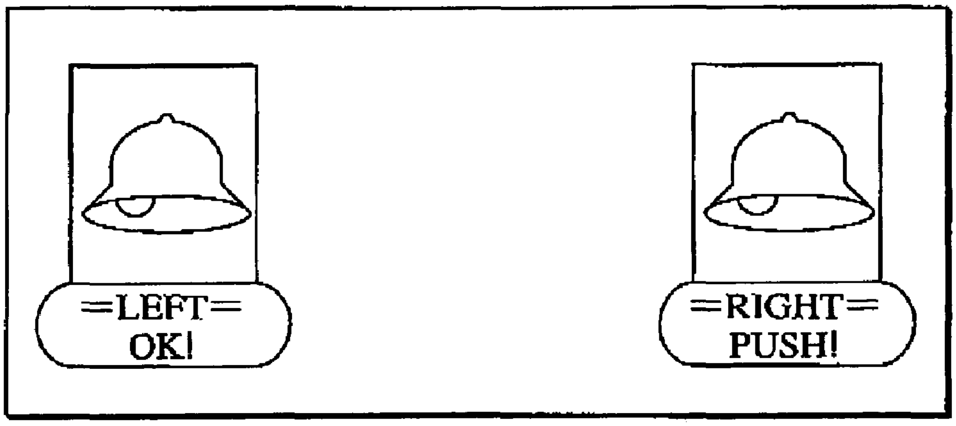
(3) PICTURE NOTIFYING TO PUSH CENTER STOP BUTTON
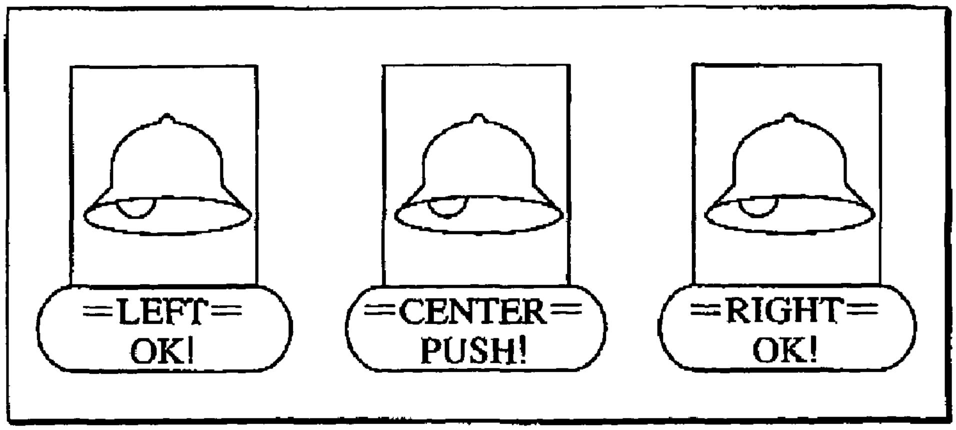

FIG.10A

PROBABILITY SAMPLING TABLE USED UNDER NORMAL GAME STATE (RANDOM NUMBER RANGE : 0~16383)

| PRIZES | RANDOM NUMBER RANGE TO BE AWARDED No. OF BET=3 | INTERNALLY WINNING PROBABILITY |
|---|---|---|
| BB | 0~54 | 55/16384 |
| RB | 55~82 | 28/16384 |
| REPLAY | 83~2327 | 2245/16384 |
| BELL PRIZE | 2328~10919 | 8592/16384 |
| PLUM PRIZE | 10920~10973 | 54/16384 |
| CHERRY PRIZE | 10974~11036 | 63/16384 |

FIG.10B

PROBABILITY SAMPLING TABLE USED UNDER NORMAL GAME STATE IN BB STATE (RANDOM NUMBER RANGE : 0~16383)

| PRIZES | RANDOM NUMBER RANGE TO BE AWARDED No. OF BET=3 | INTERNALLY WINNING PROBABILITY |
|---|---|---|
| BB | – ~ – | 0/16384 |
| RB | – ~ – | 0/16384 |
| REPLAY (RB IN BB) | 0~4199 | 4200/16384 |
| BELL PRIZE | 4200~14499 | 10300/16384 |
| PLUM PRIZE | 14500~16319 | 1820/16384 |
| CHERRY PRIZE | – ~ – | 0/16384 |

FIG.11

STOPPING CONTROL TABLE NUMBER SELECTION TABLE (RANDOM NUMBER RANGE : 0~255)

| TABLE No. | RANDOM NUMBER RANGE TO BE AWARDED No. BET = 3 | SELECTION PROBABILITY |
|---|---|---|
| No.1 | 0~42 | 43/256 |
| No.2 | 43~85 | 43/256 |
| No.3 | 86~128 | 43/256 |
| No.4 | 129~171 | 43/256 |
| No.5 | 172~213 | 42/256 |
| No.6 | 214~255 | 42/256 |

FIG.12

RELATIONSHIP BETWEEN ORDER OF OPERATION AND WINNING OF BELL PRIZE

| | | TABLE No. | | | | | |
|---|---|---|---|---|---|---|---|
| | | 1 | 2 | 3 | 4 | 5 | 6 |
| ORDER OF REEL STOPS | L-C-R | W | L | L | L | L | L |
| | L-R-C | L | W | L | L | L | L |
| | C-L-R | L | L | W | L | L | L |
| | C-R-L | L | L | L | W | L | L |
| | R-L-C | L | L | L | L | W | L |
| | R-C-L | L | L | L | L | L | W |

W : WIN (TO BE AWARDED)
L : LOSE (NOT TO BE AWARDED)

FIG.13

STOPPING CONTROL TABLE (PRIZE TO BE AWARDED)
[INTERNALLY WINNING PRIZE : BELL PRIZE]

| LEFT REEL | | CENTER REEL | | RIGHT REEL | |
|---|---|---|---|---|---|
| POSITION WHEN STOP BUTTON IS PUSHED | CONTROLLED STOP POSITION | POSITION WHEN STOP BUTTON IS PUSHED | CONTROLLED STOP POSITION | POSITION WHEN STOP BUTTON IS PUSHED | CONTROLLED STOP POSITION |
| 00 | 19 | 00 | 19 | 00 | 18 |
| 01 | 19 | 01 | 19 | 01 | 01 |
| 02 | 19 | 02 | 19 | 02 | 01 |
| 03 | 03 | 03 | 03 | 03 | 01 |
| 04 | 03 | 04 | 03 | 04 | 01 |
| 05 | 03 | 05 | 03 | 05 | 05 |
| 06 | 03 | 06 | 03 | 06 | 05 |
| 07 | 03 | 07 | 07 | 07 | 05 |
| 08 | 08 | 08 | 07 | 08 | 05 |
| 09 | 08 | 09 | 07 | 09 | 05 |
| 10 | 08 | 10 | 07 | 10 | 10 |
| 11 | 11 | 11 | 11 | 11 | 10 |
| 12 | 11 | 12 | 11 | 12 | 10 |
| 13 | 11 | 13 | 11 | 13 | 10 |
| 14 | 11 | 14 | 11 | 14 | 14 |
| 15 | 15 | 15 | 15 | 15 | 14 |
| 16 | 15 | 16 | 15 | 16 | 14 |
| 17 | 15 | 17 | 15 | 17 | 14 |
| 18 | 15 | 18 | 15 | 18 | 18 |
| 19 | 19 | 19 | 19 | 19 | 18 |
| 20 | 19 | 20 | 19 | 20 | 18 |

FIG.14

STOPPING CONTROL TABLE (PRIZE MISSED / FOR REGULAR-ORDER PUSHING AND CENTER-START PUSHING) [INTERNALLY WINNING PRIZE : BELL PRIZE]

| LEFT REEL | | CENTER REEL | | RIGHT REEL | |
|---|---|---|---|---|---|
| POSITION WHEN STOP BUTTON IS PUSHED | CONTROLLED STOP POSITION | POSITION WHEN STOP BUTTON IS PUSHED | CONTROLLED STOP POSITION | POSITION WHEN STOP BUTTON IS PUSHED | CONTROLLED STOP POSITION |
| 00 | 19 | 00 | 19 | 00 | 19 |
| 01 | 19 | 01 | 19 | 01 | 19 |
| 02 | 19 | 02 | 19 | 02 | 02 |
| 03 | 03 | 03 | 03 | 03 | 02 |
| 04 | 03 | 04 | 03 | 04 | 02 |
| 05 | 03 | 05 | 03 | 05 | 02 |
| 06 | 03 | 06 | 03 | 06 | 06 |
| 07 | 03 | 07 | 07 | 07 | 06 |
| 08 | 08 | 08 | 07 | 08 | 06 |
| 09 | 08 | 09 | 07 | 09 | 06 |
| 10 | 08 | 10 | 07 | 10 | 06 |
| 11 | 11 | 11 | 11 | 11 | 11 |
| 12 | 11 | 12 | 11 | 12 | 11 |
| 13 | 11 | 13 | 11 | 13 | 11 |
| 14 | 11 | 14 | 11 | 14 | 11 |
| 15 | 15 | 15 | 15 | 15 | 15 |
| 16 | 15 | 16 | 15 | 16 | 15 |
| 17 | 15 | 17 | 15 | 17 | 15 |
| 18 | 15 | 18 | 15 | 18 | 15 |
| 19 | 19 | 19 | 19 | 19 | 19 |
| 20 | 19 | 20 | 19 | 20 | 19 |

FIG.15

STOPPING CONTROL TABLE (PRIZE MISSED / FOR REVERSE ORDER PUSHING) [INTERNALLY WINNING PRIZE : BELL PRIZE]

| LEFT REEL | | CENTER REEL | | RIGHT REEL | |
|---|---|---|---|---|---|
| POSITION WHEN STOP BUTTON IS PUSHED | CONTROLLED STOP POSITION | POSITION WHEN STOP BUTTON IS PUSHED | CONTROLLED STOP POSITION | POSITION WHEN STOP BUTTON IS PUSHED | CONTROLLED STOP POSITION |
| 00 | 20 | 00 | 19 | 00 | 18 |
| 01 | 20 | 01 | 19 | 01 | 01 |
| 02 | 20 | 02 | 19 | 02 | 01 |
| 03 | 20 | 03 | 03 | 03 | 01 |
| 04 | 04 | 04 | 03 | 04 | 01 |
| 05 | 04 | 05 | 03 | 05 | 05 |
| 06 | 04 | 06 | 03 | 06 | 05 |
| 07 | 04 | 07 | 07 | 07 | 05 |
| 08 | 04 | 08 | 07 | 08 | 05 |
| 09 | 09 | 09 | 07 | 09 | 05 |
| 10 | 09 | 10 | 07 | 10 | 10 |
| 11 | 09 | 11 | 11 | 11 | 10 |
| 12 | 12 | 12 | 11 | 12 | 10 |
| 13 | 12 | 13 | 11 | 13 | 10 |
| 14 | 12 | 14 | 11 | 14 | 14 |
| 15 | 12 | 15 | 15 | 15 | 14 |
| 16 | 12 | 16 | 15 | 16 | 14 |
| 17 | 17 | 17 | 15 | 17 | 14 |
| 18 | 17 | 18 | 15 | 18 | 18 |
| 19 | 17 | 19 | 19 | 19 | 18 |
| 20 | 20 | 20 | 19 | 20 | 18 |

FIG.16A

TABLE FOR CEILING-AT QUANTITY SELECTION

| QTY. | VALUE |
|---|---|
| 1 | 2356 |
| 2 | 1512 |
| 5 | 196 |
| 10 | 28 |
| 30 | 4 |

FIG.16B

TABLE FOR CEILING-AT IMPLEMENTATION SAMPLING

| | VALUE |
|---|---|
| IMPLEMENT | 32 |
| STOCK | 224 |

FIG.17A

TABLE FOR CEILING START-VALUE SELECTION

| PIECES | SAMPLED VALUE |
|---|---|
| 1200 | 64 |
| 1500 | 128 |
| 1800 | 64 |

FIG.17B

TABLE FOR TRANSITION TO CEILING

| | | 1200 pc. | 1500 pc. | 1800 pc. |
|---|---|---|---|---|
| LEVEL OF CEILING | LEVEL 1 | 150 | 188 | 225 |
| | LEVEL 2 | 300 | 375 | 450 |
| | LEVEL 3 | 450 | 563 | 675 |
| | LEVEL 4 | 600 | 750 | 900 |
| | LEVEL 5 | 750 | 938 | 1125 |
| | LEVEL 6 | 900 | 1125 | 1350 |
| | LEVEL 7 | 1050 | 1313 | 1575 |
| | LEVEL 8 | 1200 | 1500 | 1800 |

FIG.18

START COMMANDS

| | |
|---|---|
| 1 | INTERNALLY WINNING PRIZE |
| 2 | BB |
| | RB |
| | REPLAY |
| | BELL |
| | PLUM |
| | CHERRY |
| | MISSED |
| | – |
| 3 | GAME STATE |
| 4 | NORMAL GAME STATE |
| | BB INTERNALLY AWARDED |
| | RB INTERNALLY AWARDED |
| | BB IN PROGRESS |
| | RB IN PROGRESS |
| | – |
| | – |
| | – |
| 5 | STOPPING CONTROL TABLE |
| 6 | TABLE No. 1 |
| | TABLE No. 2 |
| | TABLE No. 3 |
| | TABLE No. 4 |
| | TABLE No. 5 |
| | TABLE No. 6 |
| | – |
| | – |

BB COMPLETION COMMANDS

| | |
|---|---|
| 1 | STATE AT BB COMPLETION |
| 2 | GAME RE-STARTABLE |
| | SETTLEMENT |
| | FORCED GAME-OVER |
| | – |
| | – |
| | – |
| | – |
| | – |

FIG.19

WINNING COMMANDS

| | |
|---|---|
| 1 | PRIZE |
| 2 | BB |
| | RB |
| | REPLAY |
| | BELL |
| | PLUM |
| | CHERRY |
| | MISSED |
| | – |
| 3 | GAME STATE |
| 4 | NORMAL GAME STATE |
| | BB INTERNALLY AWARDED |
| | RB INTERNALLY AWARDED |
| | BB IN PROGRESS |
| | RB IN PROGRESS |
| | – |
| | – |
| | – |
| 5 | WINNING LINE |
| 6 | CENTER |
| | UPPER |
| | LOWER |
| | UPWARD SLANT TO RIGHT |
| | DOWNWARD SLANT TO RIGHT |
| | – |
| | – |
| | – |

MEDAL INSERTION COMMANDS

| | |
|---|---|
| 1 | No. OF INSERTED MEDALS |
| 2 | 1 pc. |
| | 2 pc. |
| | 3 pc. |
| | – |
| | – |
| | – |
| | – |
| | – |

GAMING APPARATUS INCLUDING A VARIABLE DISPLAY, A BACKLIGHT, A REFLECTING COVER TO DIRECTLY ILLUMINATE GAME SYMBOLS, AND A CONTROLLER TO CONTROL THE VARYING OF THE VARIABLE DISPLAY

CROSS REFERENCE TO RELATED APPLICATIONS

This application is based upon and claims the benefit of priority from the prior Japanese Patent Applications No. P2002-185048, filed on Jun. 25, 2002; the entire contents of which are incorporated herein by reference.

BACKGROUND OF THE INVENTION

1. Field of the Invention

The present invention relates to a gaming apparatus, such as slot machine, pachinko machine or other gaming apparatus, which comprise a variable display means to variably display symbols required for a game and a controller to control the varying of the display.

2. Description of the Related Art

Conventionally, as an aforementioned type of gaming apparatus, a slot machine which comprises a stopping means to stop varying of the display, as so-called "pachi-slo" gaming apparatus is known FIG. 1 shows a conventional pachi-slo gaming apparatus X.

The pachi-slo gaming apparatus X comprises, three reels 104 to 106, which variably display a plurality of symbols, in display windows 101 to 103 on a face panel 100, and a variable display unit configured with reel stop buttons 107 to 109, to stop the reels 104 to 106. If a prescribed symbol combination lines up on the variable display unit, a return is given to a player of the pachi-slo gaming apparatus X.

Further, winning lines, which relate to nine (9) symbols formed by three (3) rows X three (3) lines are printed on a front side of the face panel 100. These winning lines are a one medal winning line 111 in the middle, which becomes active if one medal is inserted two medal winning lines 112*a,* 112*b,* which become additionally active if two medals arc inserted, and three medal winning lines 113*a,* 113*b,* which become additionally active if there medals are inserted In FIG. 1, the pachi-slo gaming apparatus X also has a game token insertion slot 114 configured to accept a game token (e.g., medal or coin) and a start lever 115 configured to start a game.

Incidentally, regarding the variable display unit, besides the above mechanical type using the reels 104 to 106, there is also a display unit which can variably display symbols using a liquid crystal display (LCD), etc.

As for procedure of playing game, a game is started by insertion of a game token into the game token insertion slot 114. The controller then controls the variable display unit to spin the reels 104 to 106 according to an operation of the start lever 115 by the player, and symbols are then variably displayed.

The variably displayed symbols stop automatically after a certain period of time or stop according to an operation of the reel stop buttons 107 to 109 so as to stop spinning of the reels 104 to 106 one after the other. As a result, if symbols on the reels 104 to 106 appeared within the display windows 101 to 103 reach a certain combination (winning combination), game tokens are paid out so that a return can be given to the player.

The aforementioned pachi-slo gaming apparatus X has a plurality of winning modes. Specifically, in a case where the player wins a prescribed prize, in addition to a single payout of medals, a game state is transferred to an advantageous state for the player for a certain period of time rather than the normal game state. As for such prizes, there are a big bonus (hereinafter referred to as "BB"), which allows a certain number of games serving relatively a bigger return to the player, and a regular bonus (hereinafter referred to as "RB"), which allows a certain number of games serving relatively a smaller return to the player.

Further, in the pachi-slo gaming apparatus X, a combination of symbols that lines up along the active winning lines 111 to 113 (hereinafter referred to as "active line") is internally sampled (hereinafter referred to as "internal sampling"), and winning is determined based on the result of internal sampling and a timing when the player performs a stopping operation by pushing of the reel stop buttons 107 to 109.

In other words, in order to win a prize which medals or coins are paid out, it is necessary that winning as a result of internal sampling (hereinafter referred to as "internally winning"), and that the player performs the stopping operation at a timing that allows lining up of the combination corresponding to the prize acquired by internally winning (hereinafter referred to as "internally winning prize") along the active line(s).

It means that even if the internally winning is achieved, the prize is not awarded in a case where the timing of the stopping operation is not appropriate. Therefore, a technique of performing the stopping operation in a timely manner (which is called "see-and-push" and which intervention of player's technique is high) is required, and such a type of pachi-slo gaming apparatus has become major today.

Regarding such a type of pachi-slo gaming apparatus, various techniques have been recently proposed to display the symbols as well as the winning lines 111 to 113 on the face panel 100 in order to improve attractiveness and to ease identification of the winning prizes.

For example, in the gaming apparatus described in the Japanese patent publication No. P2000-350805, an information display panel having some transparency is placed on the rear or close to the rear of the face panel and is configured with a matrix display unit enabling display by a dotted pattern using dots formed by a plurality of lines and columns. Moreover, the information display panel is configured by a transparent electronic luminescent (EL) panel in order to display characters and symbols, etc. on the panel by a dotted pattern.

However, in the gaming apparatus comprising the information display panel (i.e., Japanese patent publication No. P2000-350805), although display of various information including images for entertainment can be accomplished, the symbols of the respective reels are viewed through the dotted pattern because the information display panel is transparent.

Accordingly, it is a problem that both the images for entertainment and the symbols of the respective reels may not be displayed clearly.

BRIEF SUMMARY OF THE INVENTION

The present invention has been made in view of the above problem, and thus has an object of providing a gaming apparatus, which enables viewing of both the symbols of the reel and the images for entertainment, etc. that are displayed on the front side display unit, more clearly.

To achieve the object, in the present invention described in the claim 1, a gaming apparatus comprises a variable display unit configured to variably display a plurality or symbols, a front side display unit located in front of the variable display unit and configured to enable viewing of the symbols displayed by the variable display unit, an internally winning prize determiner configured to determine an internally winning prize, a stopping controller configured to stop the varying of display of the variable display unit based on a result of determination by the internally winning prize determiner, and wherein the front side displaying unit does not display any objects on an area fox enabling viewing of the symbols displayed by the variably display unit, and a prize is awarded if a stopped state displayed on the variable display unit, which is caused by the stopping controller, matches a prescribed stopped state.

In the present invention described in claim 2, the front side display unit has an opening area where the symbols displayed by the variable display unit to be seen.

In the present invention described in claim 3, the gaming apparatus further comprises a plurality of stoppers configured to stop the varying of display of the variable display unit.

BRIEF DESCRIPTION OF THE SEVERAL VIEWS OF THE DRAWINGS

FIG. 6 is a diagram showing a symbol string arranged on the reel;

FIG. 7 is a diagram showing prizes and the number of paid medals corresponding to the winning symbol combinations;

FIG. 8 is a diagram showing an example of a ceiling indicator;

FIG. 9 is a diagram showing an example of an image notifying an order of stopping reels;

FIG. 10A is a diagram showing a probability-sampling table;

FIG. 10B is a diagram showing a probability-sampling table;

FIG. 11 is a diagram showing a stopping control table number selection table;

FIG. 12 is diagram showing a relationship between an order of a stopping operation and winnings;

FIG. 13 is a diagram showing an example of a stopping control table;

FIG. 14 is a diagram showing an example of a stopping control table;

FIG. 15 is a diagram showing an example of a stopping control table;

FIG. 16A is a diagram showing a table for ceiling-AT quantities selection;

FIG. 16B is a diagram showing a table for ceiling-AT implementation sampling;

FIG. 17A is a diagram showing a table for ceiling start-value selection;

FIG. 17B is a diagram showing a table for transition to ceiling;

FIG. 18 is a diagram showing an example of commands transmitted from a main controller to a sub controller;

FIG. 19 is a diagram showing an example of commands transmitted from a main controller to a sub controller;

DETAILED DESCRIPTION OF THE INVENTION

The gaming apparatus of present invention comprises a variable display unit configured to variably display a plurality of symbols, a front side display unit located in front of the variable display unit and configured to enable viewing of the symbols displayed by the variable display unit, an internally winning prize determiner configured to determine an internally winning prize, a stopping controller configured to stop the varying of display of the variable display unit based on a result of determination by the internally winning prize determiner, and wherein the front side displaying unit does not display any objects on an area for enabling viewing of the symbols displayed by the variable display unit, and a prize is awarded if a stopped state displayed on the variable display unit, which is caused by the stopping controller, matches a prescribed stopped state.

Further, the front side display unit has an opening area where the symbols displayed by the variable display unit to be seen.

Therefore, both the symbols displayed by the variable display unit and the images for entertainment, etc. are clearly displayed. This means that not only the images for entertainment displayed by the front display unit but also the symbols displayed by the variable display unit are easily viewed by a player of the gaming apparatus so that the player can be entertained.

Hereinafter, a gaming apparatus according to the embodiment will be described in detail with reference to associated drawings.

Figure 1:
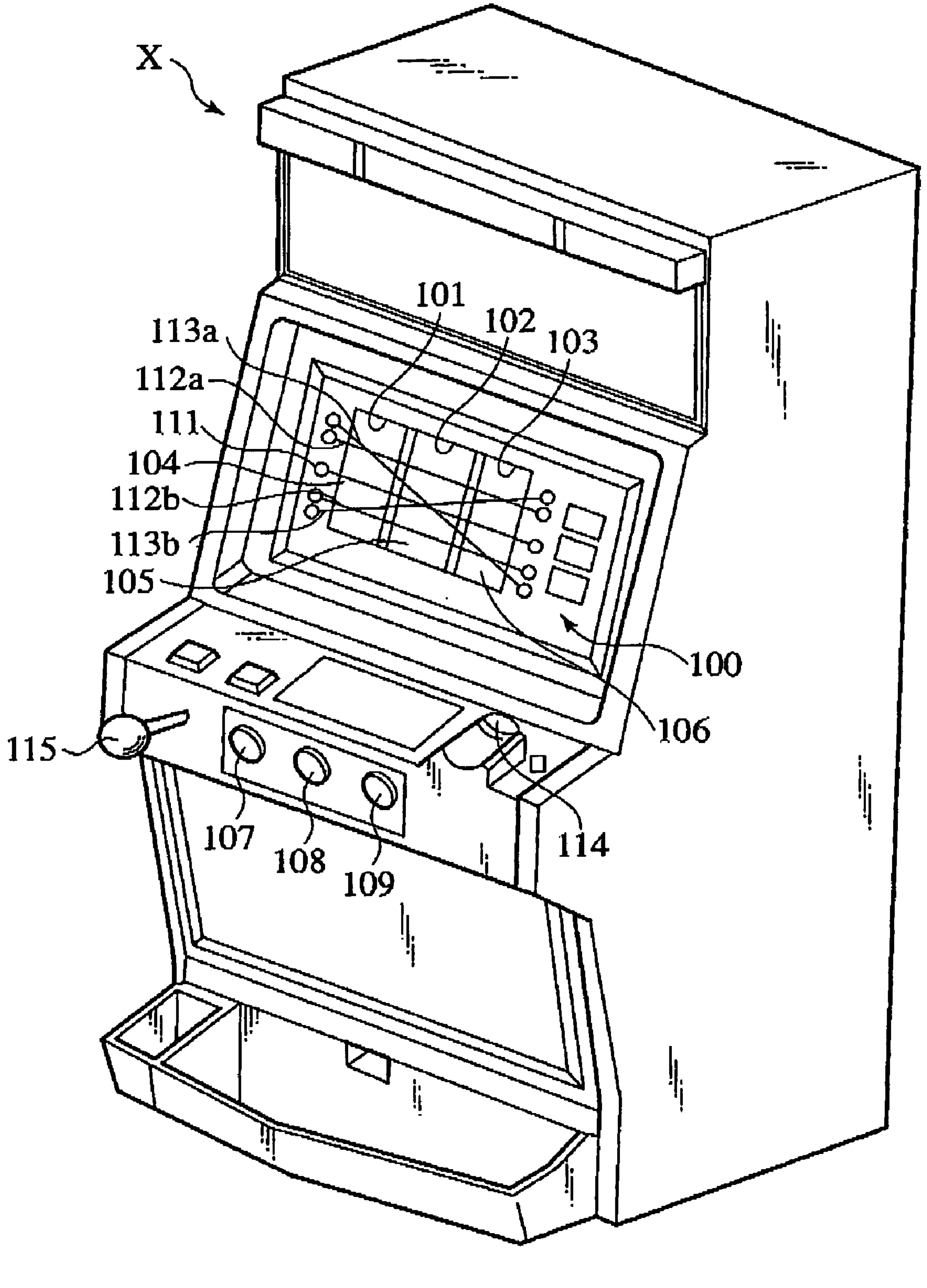
FIG. 1 is diagram showing an example of a conventional gaming apparatus.
Figure 2:
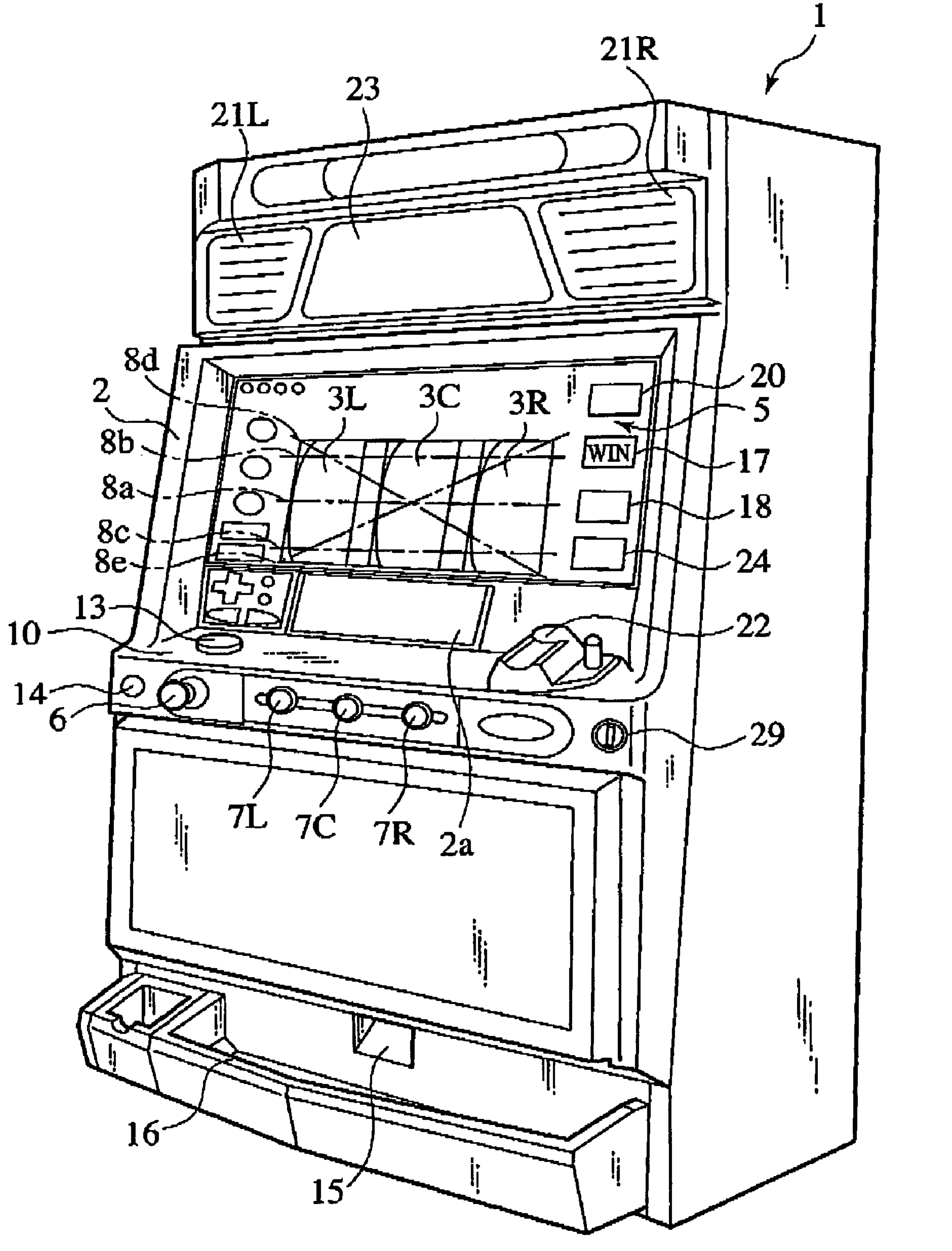
FIG. 2 is a perspective view showing an exterior of the slot machine according to the embodiment of the present invention.
Figure 3:
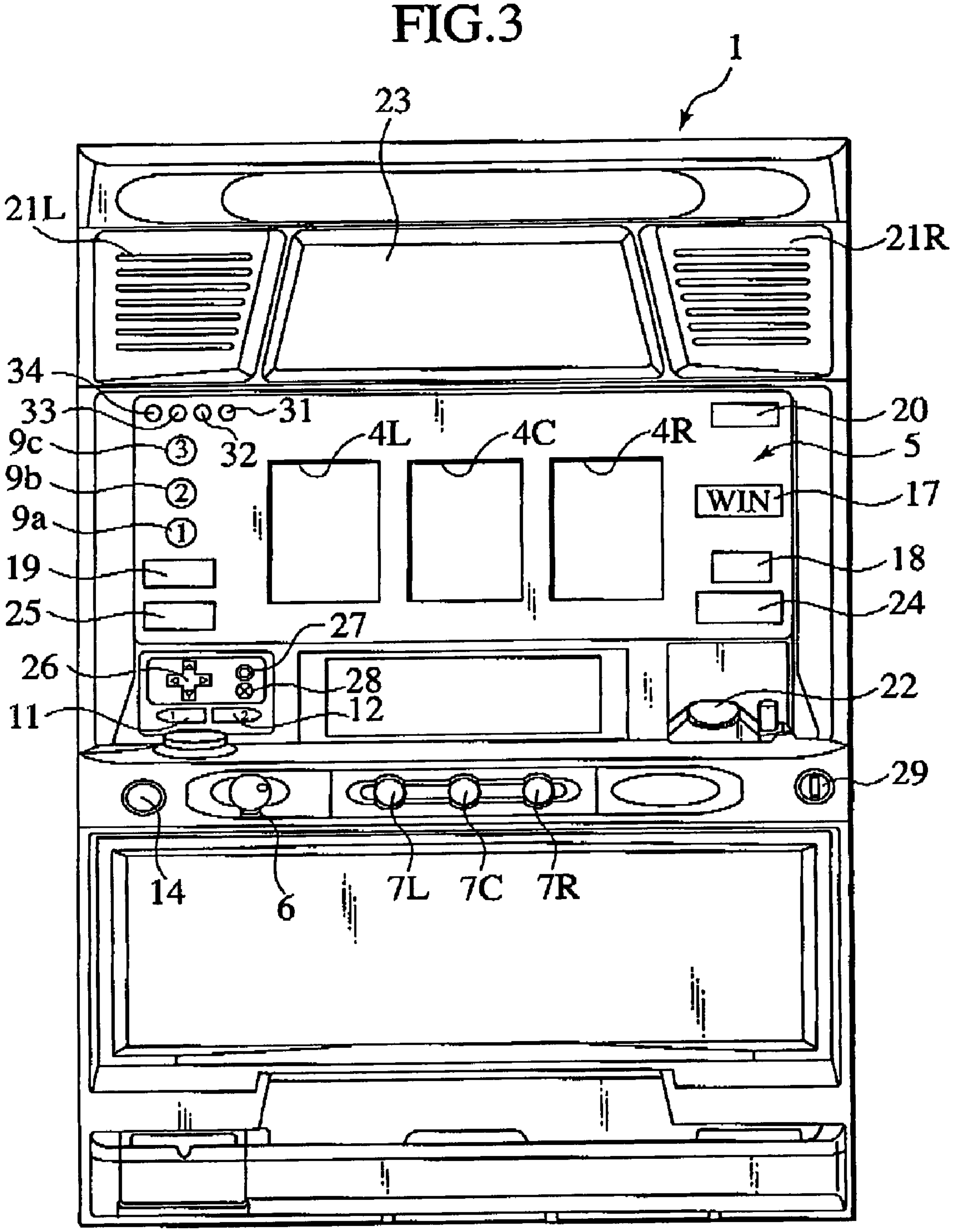
FIG. 3 is a front side view showing an exterior of the slot machine according to the present invention.

FIG. 2 is a perspective view showing an exterior of a gaming apparatus 1 according to an embodiment of the present invention, and FIG. 3 is a front side view of the gaming apparatus 1.

The gaming apparatus 1 comprises three spinning reels which variably display symbols, a so-called "pachi-slo machine". A game can be played using a token (coin or medal), or game media, e.g., a card, storing information regarding the value of the game which has been or is to be given to a player. Hereinafter, it is assumed that medals are utilized for playing the game.

A panel display unit 5, which comprises an LCD, is placed in the middle of a cabinet 2 that forms the gaming apparatus 1.

Further, three spinning reels 3L, 3C, 3R are placed in a line in the cabinet 2 and a symbol string formed by a plurality of the symbols are shown on the circumference of the respective reels. The spinning reels 3L, 3C, 3R configure the variable display unit in the embodiment. The symbols of the respective reels can be viewed through display windows 4L, 4C, 4R and the panel display unit 5. The respective reels spin at a constant speed (e.g., 80 rpm).

Although configuration of the panel display unit 5 will be described later, a display screen 5*a,* which is configured by an LCD and enables viewing of the spinning is reels 3L, 3C, 3R, is placed entirely on the panel display unit 5. The display screen 5*a* configures the front side display unit in the embodiment and the following elements appear from a player point of view.

The oblong display windows 4L, 4C, 4R in the middle of the display screen 5*a* can be viewed by the player. Further, a centerline 8*a,* a top line 8*b* and a bottom line 8*c,* which are horizontally drawn, and a cross-down line 8*d* and a cross-up line 8*e,* which are diagonally drawn can also be viewed on the display windows 4L, 4C, 4R. One, three or five winning lines become active by either an operation of a 1-BET switch 11, a 2-BET switch 12, a MAX-BET switch 13 or insertion of medals to a medal insertion slot 22. The line being active can be identified by lighting of the line and a BET lamps 9*a,* 9*b,* 9*c*.

Specifically, the 1-BET lamp 9*a,* the 2-BET lamp 9*b,* the MAX-BET lamp 9*c* and a credited medal indicator 19 are placed at the left side of the display windows 4L, 4C, 4R The 1-BET lamp 9*a,* the 2-BET lamp 9*b* and the MAX-BET lamp 9*c* light according to the number of bet medals (hereinafter referred to as "BET No.") for a single game. Here, in the embodiment, a single game is completed when all the reels have stopped spinning, or the game media is paid out if that is the case.

The 1-BET lamp 9*a* lights if the BET No. is one, and one winning line has become active. The 2-BET lamp 9*b* lights if the BET No. is two, and three winning lines have become active. The MAX-BET lamp 9*c* lights if the BET No. is three, and all the winning lines (i.e., five lines) have become active. Further, a start acceptance lamp 25 lights if, at least, one winning line has become active. Moreover, the credited medal indicator 19 indicates the number of credited medals.

A WIN lamp 17, a payouts indicator 18 and a medal acceptance lamp 24 are placed at the right side of the display windows 4L, 4C, 4R. The WIN lamp 17 lights with a prescribed probability if the internally winning of BB or RB occurs. The WIN lamp 17 also lights if the player wins BB or RB. The payouts indicator 18 is configured by a seven-segment LED and indicates the number of medals to be paid out at winning the prize. The medal acceptance lamp 24 blinks when insertion of the medal can be accepted.

A bonus game counter 20 is placed at the upper right side of the display screen 5*a*. The bonus game counter 20 indicates the number of RB games and the number of possible RB game winnings, etc., which will be described later.

A game-stop indicator 31, a replay indicator 32, an RB indicator 33 and a BB indicator 34 are placed in a line at the upper left side of the display screen 5*a*. The game-stop indicator 31 lights if the elapsed time from the spinning of the reels last time is less than a prescribed time (4.1 seconds in the embodiment). The replay indicator 32 lights when a replay is allowed. The RB indicator 33 lights while RB is in progress and the BB indicator 34 lights while BB is in progress.

Further, in a case where the internally winning of the "bell prize" occurs during the "stopping operation assist-dime (AT) ", the "order of stopping reels" for achievement of the prize is also displayed on the display screen 5*a*.

A base 10 is formed below the display windows 4L, 4C, 4R and an indication unit 2*a,* which displays information regarding the gaming apparatus 1, is placed between the base 10 and the display windows 4L, 4C. 4R.

Further, the modal insertion slot 22 is placed at the right side of the indication unit 2*a,* and the 1-BET switch 11, the 2-BET switch 12 and the MAX-BET switch 13 are placed at the lower left position of the indication unit 2*a*. In addition, a control button 26, an okay button 27 and a cancel button 28 are placed at the upper left position of the indication unit 2*a*.

If the 1-BET switch 11 is pushed, one medal is bet from the credited medals. If the 2-BET switch 12 is pushed, two medals are bet from the credited medals. Similarly, if the MAX-BET switch 13 is pushed, the maximum allowed number of medals is bet. The prescribed winning lines are to be active by an operation of the is BET switches as described above.

Moreover, switching of image displayed on the display screen 5*a* and input of information can be performed using the control button 26, the okay button 27 and the cancel button 28.

At the left side of the front face of the base 10, a credited medal settlement switch 14 in order for the player to credit/pay out the medals is placed. Medals are paid out from a medal payout slot 15 and stored in a medal tray 16 by an operation of the credited medal settlement switch 14. A start lever 6, which moves freely within prescribed angles and accepts an operation of the player, is mounted at the right side of the credited medal settlement switch 14 to start variably display the symbols of the reels as in the display windows 4L, 4C, 4R (i.e., to start a game).

At the left side of the front face of the base 10, a door opening/forced game-over reset unit 29 is placed The door opening/forced game-over reset unit 29 allows opening of the front door if a prescribed key is inserted and tamed to the right, and resets the forced game-over if the prescribed key is inserted and turned to the left Speakers 21L, 21R are placed at the upper left and right side of the cabinet 2. A payout table panel 23, which indicates winning symbol combinations and the number of medal to be paid out, is placed between the speaker 21L and 21R. In the middle of the front face of the base 10 and the lower side of the indication unit 2*a,* stop buttons 7L, 7C, 7R to stop the spinning reels 3L, 3C, 3R are placed.

Figure 36:
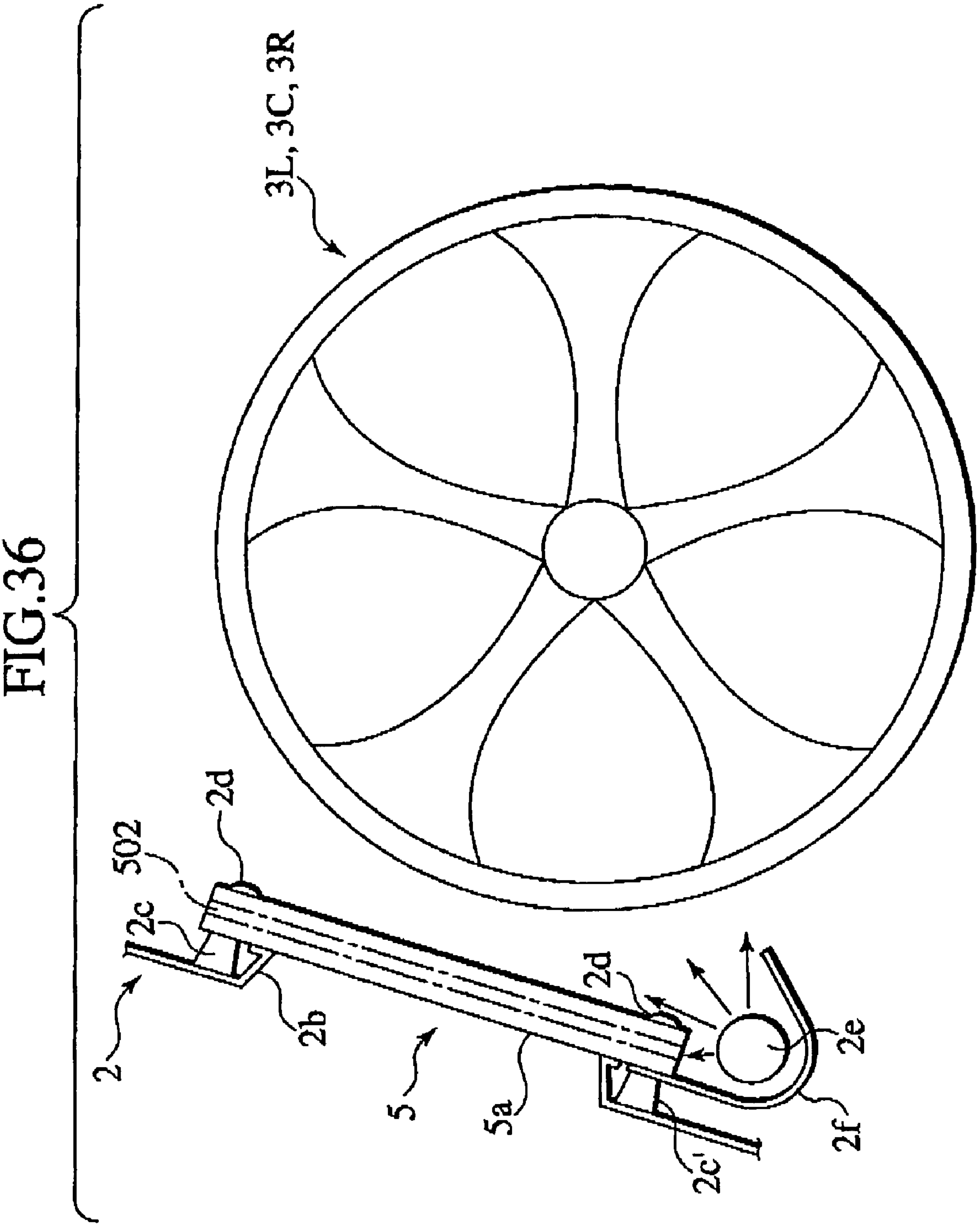
FIG. 36 is a diagram explaining an arrangement of the panel display unit.

As shown in FIG. 36, the panel display unit 5 is mounted to a front opening area 2*b* from the rear side, and the portion disclosed from the cabinet 2 configures the display screen 5*a*.

Incidentally, the notations 2*c*, 2*c*' show upper and lower bosses and the notation 2*d* shows a screw for mounting the panel.

Figure 37:
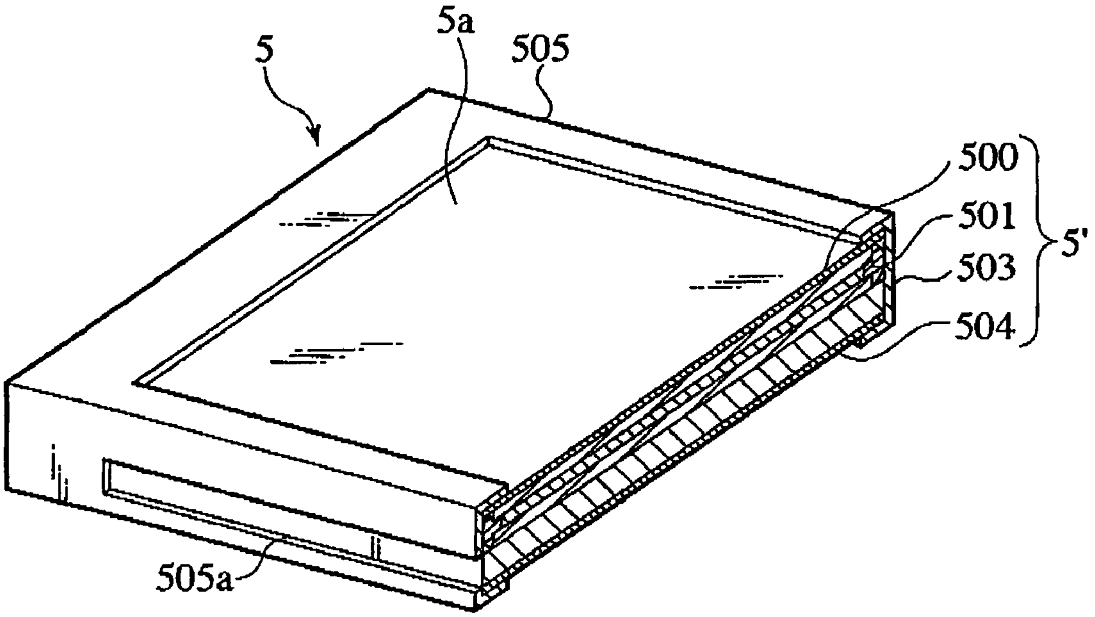
FIG. 37 is a diagram explaining a panel display unit.

As shown in FIG. 37, the panel display unit 5 is configured by a multiple layer panel 5', which is clamped by a frame 505 that has a rectangular shape.

The multiple layer panel 5' is configured by multiple layers such as a protection glass 500 and an LCD panel 501, both of which substantially configure the front side display unit, a light guiding panel 503 having a prescribed thickness, which configures a part of a backlight structure, and a scattering panel 504, which is formed by a plastic film attached to the light guiding panel 503. Incidentally, a surface of the scattering panel 504 is processed so as to be uneven, in order for the beam to scatter. Further, a transparent acrylic panel may be used instead of the protection glass 500.

Figure 38:
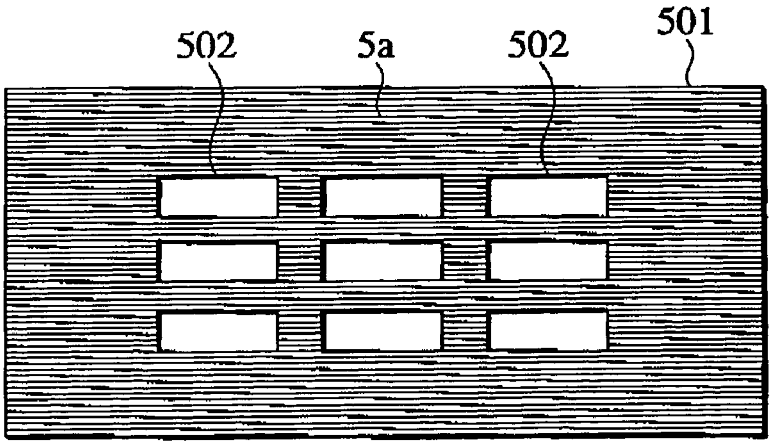
FIG. 38 is a diagram explaining an LCD panel.

Here, as shown in FIG. 38, the LCD panel 501 may have a hole 502, which enables viewing of the symbols displayed on the spinning reels 3L, 3C, 3R, additionally, no objects may be displayed on the area where viewing of the symbols of the spinning reels 3L, 3C, 3R (the hole 502) is enabled.

Further, the backlight is set between the front side display unit and the variable display unit in order to light up the symbols of the spinning reels 3L, 3C, 3R. Specifically, a cold cathode fluorescent lamp (CCFL) 2*e*, which functions as the backlight of the LCD panel 501 and lights up the symbols of the spinning reels 3L, 3C, 3R is set below the multiple layer panel 5' and between the multiple layer panel 5' and the spinning reels 3L, 3C, 3R.

More specifically, the CCFL 2*c* is positioned at the bottom of the scattering panel 504, and the frame 505 has a notch 505*a* for the beam of the CCFL 2*e* to pass through from the bottom of the scattering panel 504. Thus, the beam of the CCFL 20 can light up the whole area of the scattering panel 504 and can scatter towards the front side via the scattering panel 504. The CCFL 20 therefore functions as the backlight of the LCD panel 501.

Further, the beam of the CCFL 2*e* also lights up the spinning reels 3L, 3C, 3R, which are positioned behind the multiple layer panel 5'. In FIG. 38, a notation 2*f* shows a reflecting cover which surrounds the CCFL 2*e* and has U-shaped cross-section. The reflecting cover is mounted to the lower boss 2*c*' together with the multiple layer panel 5'.

As described above, in the embodiment, since the front side displaying unit does not display any objects on an area for enabling viewing of the symbols displayed by the variable display unit, both the symbols displayed by the variable display unit and the images for entertainment, eta are clearly displayed. This means that not only the images for entertainment displayed by the front display unit but also the symbols displayed by the variable display unit are easily viewed by a player of the gaining apparatus so that the player can be entertained.

Especially, since the front side display unit has an opening area where the symbols displayed by the variable display unit to be seen, both the symbols displayed by the variable display unit and the images for entertainment, etc. are more clearly displayed. This means that not only the images for entertainment displayed by the front display unit but also the symbols displayed by the variable display unit are easily viewed by a player of the gaming apparatus so that the player can be entertained.

Further, since the backlight is set in the front display unit in order to light up the symbols displayed by the variable display unit, not only the front side display unit but also the symbols displayed by the variable display unit are lit up, whereby both the symbols displayed by the variable display unit and the images for entertainment, etc. are clearly displayed This means that not only the images for entertainment displayed by the front display unit but also the symbols displayed by the variable display unit are easily viewed by a player of the gaming apparatus so that the player can be entertained.

Moreover, in a case where the backlight is set between the front display unit and the variable display unit, the interior space of the gaming apparatus can be effectively utilized and the backlight can be installed in the gaming apparatus without enlarging a size of the gaining apparatus.

Still more, in a case where a prescribed object, i.e. lamps (the 1-BET lamp 9*a*, the 2-BET lamp 9*b*, the MAX-BET lamp 9*c* and the WIN lamp 17) and indicators (the payouts indicator 18, the credited medal indicator 19 and the bonus game counter 20), are displayed using the front side display unit on the periphery of the variable display unit, indications using such lamps and indicators installed in the face panel, which are adopted in the conventional gaming apparatus, can be performed by the front display unit. Thus, installation of the lamps is not required and the number of parts of the gaming apparatus can be decreased so as to reduce the manufacturing cost of the so gaming apparatus.

The gaming apparatus 1 is configured as heretofore described, and hereinafter, an operation to spin the spinning reels 3L, 3C, 3R using the start lever 6, and to stop spinning of the spinning reels 3L, 3C, 3R respectively using the three stop buttons 7L, 7C, 7R will be described.

In the embodiment, a stopping operation performed when all the spinning reels 3L, 3C, 3R are spinning is called a "first stopping operation", a stopping operation performed the following is called a "second stopping operations", and a stopping option performed after the "second stopping operation" is called a "third stopping operation".

Further, pushing the left stop button 7L as the "first stopping operation" is called "regular-order pushing", pushing the center stop button 7C as the "first stopping operation" is called "center-start pushing", and pushing the right stop button 7R as the "first stopping operation" is called "reverse-order pushing".

Since the three stop buttons 7L, 7C, 7R arc placed in the gaming apparatus 1, the order of the operation becomes six ways. The order of the operation is then classified as follows.

Here, the left stop button 7L is abbreviated as "L", the center stop button 7C is abbreviated as "C", and the right stop button 7R is abbreviated as "R". For descriptive purposes, the first stopping operation is indicated starting from the left. In other words, for example, if the left stop button 7L is pushed as the "first stopping operation", the center stop button is pushed as the "second stopping operation", and then the right stop button is pushed as the "third stopping operation", it is indicated as "L-C-R". As described, six ways of the stopping operation exist in the embodiment, such as "L-C-R", "L-R-C", "C-L-R", "C-R-L", R-L-C' and "R-C-L".

FIG. 6 shows a symbol string, which is indicated on the spinning reels 3L, 3C, 3R, and which has 21 segments formed by a plurality of the symbols. A code number in a range of "00 to 20" is assigned to each symbol and is stored in a program ROM 42 as data table. The symbol string formed by a "RED7", "BLUE7", "BAR", "BELL", "PLUM", "REPLAY" and "CHERRY" is indicated on the respective spinning reels 3L, 3C, 3R The spinning reels 3L, 3C, 3R spin as the symbol string moves to the direction indicated by the arrow in FIG. 6.

FIG. 7 shows prizes to be awarded and the number of medals to be paid out corresponding to the winning symbol combinations.

The game state is divided into three states, such as the "normal game state", the "normal game state in BB state", and the "RB game state".

Although there is a case where the normal game state is further divided based on either the internally wining of BB or RB occurs, prizes to be awarded by the internally winning are similar to the three states as shown in FIG. 7.

Incidentally, the type of prizes awarded by the internally winning is determined by a probability-sampling table (the probability sampling table will be described later). The probability sampling tables are provided for the respective game states. This means that the same type of prizes is awarded by the internally winning in the same game state.

As shown in FIG. 7, in the normal game state, if "RED7-RED7-RED7" or "BLUE7-BLUE7-BLUE7" lines up along the active line, BB is acquired together with payout of 15 medals, and then the game state starting from the next game becomes the BB state.

The "RB game state" occurs when "BAR-BAR-BAR" lines up along the active line during the "normal game state", or "REPLAY-REPLAY-REPLAY" lines up along the active line during the "normal game state in the BB state" (which is called "JAC IN"). At this point in time, 15 medals are paid out. The "RB game state" is a game state in which "REPLAY-REPLAY-REPLAY" easily lines up so as to win the prize that pays out 11 medals if one medal is bet A maximum of 12 games are allowed in the RB game state (which is called "allowed RB games"). Further, winning the prize can be allowed up to 8 times during the RB game state (which is called "allowed RB game winnings"). This means that the RB game state is completed when the number of games reaches 12 times or the number of winning reaches 8 times. The game state is transferred to the normal game state as soon as the RB game state is completed.

The BB state completes when 30 games under the normal game state in BB state are complete, or the third RB is completed after transfer to the RB game state three times during the BB state. The game state is then transferred to the normal game state as soon as the BB state is completed.

In the normal game state, a game replay is awarded if "REPLAY-REPLAY-REPLAY" lines up along the active line. Since the same number of inserted medals as the last game is automatically inserted if the replay is awarded, the a player can play a game without betting medals.

In the normal game state or the normal game state in BB state, "Bell prize" is awarded if "BELL-BELL-BELL" lines up along the active fine. Whether the prize is awarded or not when the internally winning of the "Bell prize" has occurred is determined based the table number, which will be described later, and the order of pushing the stop buttons 7L, 7C, 7R by the player.

Specifically, the "BELL-BELL-BELL" lines up along the active line and the "Bell prize" is awarded only if the stopping operation is performed according to the order of operation corresponding to the table number selected from the six ways. If the stopping operation is performed by one of the other five orders, the "Bell prize" is not awarded.

In addition, it is possible that the "Plum prize" and the "Cherry prize" are awarded during the normal game state and the normal game state in BB state, and the number of medals to be paid out is as shown in FIG. 7.

If the internally winning of the "Bell prize" occurs during the normal game state, the "stopping operation assist-time (AT)", in which the order of the operation to acquire the prize is notified, is provided. Therefore, the player will certainly acquire the prize if the internally winning of "Bell prize" occurs during the "stopping operation assist-time (AT)".

FIG. 8 is a diagram explaining an example of the "ceiling indicator", which indicates the process by which relieving of the player is implemented. The scale shown in FIG. 8 indicates difference between the total number of consumed medals and the total number of paid medals. In other words, during the normal game state, since consumed medals are larger than paid medals normally, the level of the ceiling indicator increases accordingly until the bonus game is awarded. The ceiling indicator indicates the level "1" when BB is completed, and the relieving of the player, which is called "ceiling", is implemented as soon as it reaches the level "8".

Hereinafter, with reference to FIG. 9, the images displayed on the display screen 5*a* if the internally wining of the "Bell prize" occurs during the AT (assist-time), i.e., the images notifying the order of the operation, will be described. It is assumed in FIG. 9 that the operation in the order of the "L-R-C" is required to acquire the prize.

The FIG. 9(1) shows the image to be displayed at the start of the game. The symbol of a bell is displayed on the left side area, which notifies that the internally winning of the "Bell prize" has occurred. Further, the "=LEFT=PUSH!" message is displayed below the symbol and notifies to push the left stop button 7L as the a "first stopping operation" to acquire the prize.

The FIG. 9(2) shows the image to be displayed after the "first stopping operation" is performed. The symbol of a bell is displayed on the right side area, and the "=RIGHT=PUSH!" message is displayed below the symbol and notifies to push the right stop button 7R as the "second stopping operation".

The FIG. 9(3) shows the image to be displayed after the "second stopping operation" is performed. The symbol of a bell is displayed in the middle, and the "=CENTER=PUSH!" message is displayed below the symbol and notifies to push the center stop button 7C as the "third stopping operation". If the first and second stopping operations are performed according to the messages displayed on the display screen 5*a*, the "BELL-BELL-BELL" lines up along the active line after the third stopping operation and then the "Bell prize" is awarded.

It is to be noted that in FIG. 9, as the mode of notifying the order of the operation, although the stop button to be pushed is notified one after the other, the order of the operation may be notified at once at the start of the game. For example, the "L-R-C" can be displayed on the display screen 5*a* as the order of the operation.

Figure 4:
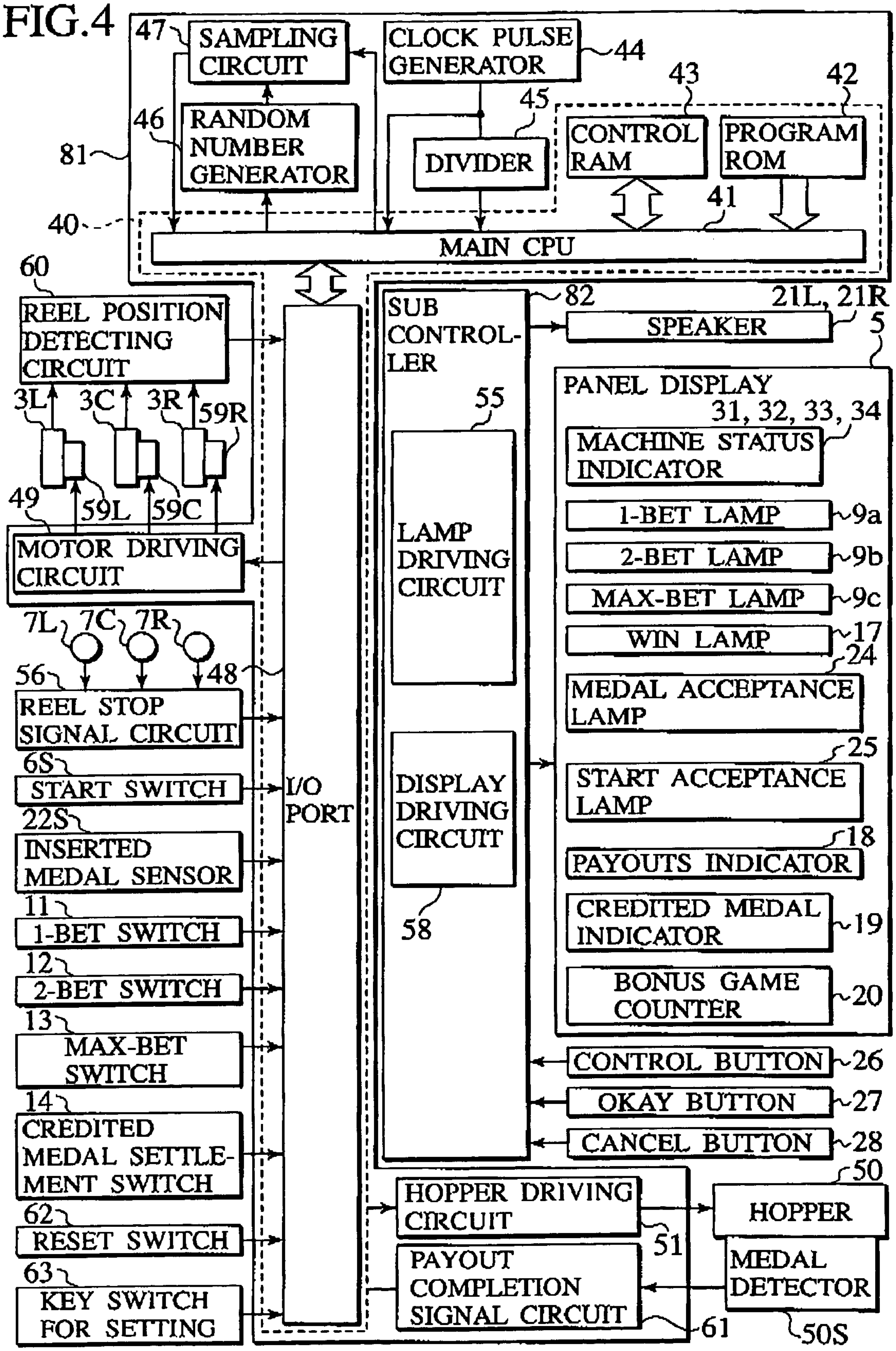
FIG. 4 is a block diagram showing circuit configuration of the slot machine according to the embodiment of the present invention.

FIG. 4 shows circuit configuration including a main controller 81 for controlling the processes of the game in the gaming apparatus 1, peripheral units (actuator) electrically connected to the main controller 81, and a sub controller 82 for controlling the panel display unit 5 as well as the speakers 21L, 21R based on the instruction transmitted by the main controller 81.

The main controller 81 is mainly configured by a microcomputer 40, and circuits for a random number sampling are added. The microcomputer 40 includes a CPU 41 for performing controls according to the preset program, and the program ROM 42 as well as a RAM 43 as a storing means.

A clock pulse generator 44 as well as a divider 45 for generating a base clock pulse and a random number generator 46 as well as a sampling circuit 47 for generating a random number to be sampled are connected to the CPU 41. The sampling of the random number may be performed in the microcomputer 40, i.e., the sampling may be performed on the program running on the CPU 41. In this case, the random number generator 46 and sampling circuit 47 can be omitted, or they may remain to back up the sampling performed in the CPU 41.

In the program ROM 42, the probability-sampling table for the sampling of the random number performed when the start lever 6 is operated (a start operation), a "stopping control table" for determination of a stopped state of the reels depends on an operation of the stop buttons, and various instructions (commands) for transmitting to the sub controller 82 are stored. As for the commands, for example, there are a "demonstration display command", a "start command", an "all reels stop command" and a "winning command". These commands will be described later. Incidentally, the sub controller 82 does not transmit a command to the main controller 81, and communication is initiated only from the main controller 81 to the sub controller 82.

In the circuit shown in FIG. 4, as an actuator controlled based on a control signal transmitted by the microcomputer 40, there are a hopper 50, which accepts medals and pays out a prescribed number of medals as a game value serving means, based on instructions from a hopper driving circuit 51 and stepping motors 59L, 59C, 59R for driving the spinning reels 3L, 3C, 3R.

Further, a motor driving circuit 49 for driving the stepping motors 59L, 59C, 59R, the hopper driving circuit 51 for driving the hopper 50, a lamp driving circuit 55 for driving lamps, and a display driving circuit 58 for driving the display units are connected to the output port of the CPU 41 via an I/O port 48. These driving circuits control the respective actuators based on a received control signal from the CPU 41.

Moreover, as an input signal generating means for generating a required input signal for the microcomputer 40 to generate instructions, there are a start switch 6S, the 1-BET switch 11, the 2-BET switch 12, the MAX-BET switch 13, the credited medal settlement switch 14, an inserted medal sensor 22S, a reel stop signal circuit 56, a reel position detecting circuit 60 and a payout completion signal circuit 61, and they are also connected to the CPU 41 via the I/O port 48.

The start switch 6S detects the operation of the start lever 6. The inserted medal sensor 22S detects the medal inserted into the medal insertion slot 22. The reel stop signal circuit 56 generates a stop signal according to the operation of the stop buttons 7L, 7C, 7R. The reel position detecting circuit 60 receives a pulse from a reel-spinning sensor and provides the CPU 41 with a signal for detecting the positions of the spinning reels 3L, 3C, 3R. The payout completion signal circuit 61 generates a signal, which detects completion of a medal payout, when the count measured by a medal detector 50S reaches a prescribed number.

In the circuit shown in FIG. 4, the random number generator 46 generates a random number within a certain range, and the sampling circuit 47 samples a single random number at an appropriate timing after the start lever 6 is operated. Internally winning is then determined based on the sampled random number and the probability-sampling table stored in the program ROM 42. After the internally winning is determined, a random number is again sampled in order to select the stopping control table.

After spinning of the spinning reels 3L, 3C, 3R is started, the number of driving pulses supplied to the respective stepping motors 59L, 59C, 59R is counted, and the counted number is written to the RAM 43. A reset pulse is transmitted every single rotation from spinning reels 3L, 3C, 3R and is inputted to the CPU 41 via the reel position detecting circuit 60. The reset pulse then clears the counted number of driving pulses stored in the RAM 43. Therefore, the counted numbers corresponding to the position within a single rotation for the respective spinning reels 3L, 3C, 3R are stored in the RAM 43.

A symbols table is stored in the program ROM 42 in order to correlate the position of the spinning reels 3L, 3C, 3R with the symbols indicated on the circumference of the reel. In the symbols table, the code number, which is assigned per a certain rotating pitch of the spinning reels 3L 3C, 3R, and a symbols code, which indicates the symbols that correspond to the respective code numbers, are correlated.

Further, a winning symbol combinations table is stored in the program ROM 42. In the winning symbol combinations table, a winning symbol combination, the number of medals to be paid out and a winning determination code for determination of the winning are correlated. The winning symbol combinations table is referred when the spinning reels 3L, 3C, 3R is controlled to stop and when the winning is confirmed after all the reels stopped.

If the internally winning occurs as the result of the sampling (the probability sampling process), the CPU 41 transmits a signal to the motor driving circuit 49 to stop the spinning reels 3L, 3C, 3R based on a signal transmitted by the reel stop signal circuit 56 when the stop buttons 7L, 7C, 7R are operated by the player and the selected winning symbol combinations table.

If the stopped state matches the symbol combination determined as the result of the internally winning, the CPU 41 transmits a signal instructing payout to the hopper driving circuit 51 and the hopper 50 pays out a prescribed number of medals. At this point in time, the medal detector 50S counts the number of medals paid by the hopper 50 and a signal, which notifies completion of medal payout, is inputted to the CPU 41 when the counted number reaches the specified value. The CPU 41 then deactivates the hopper 50 via the hopper driving circuit 51 so as to complete the medal payout process.

Figure 5:
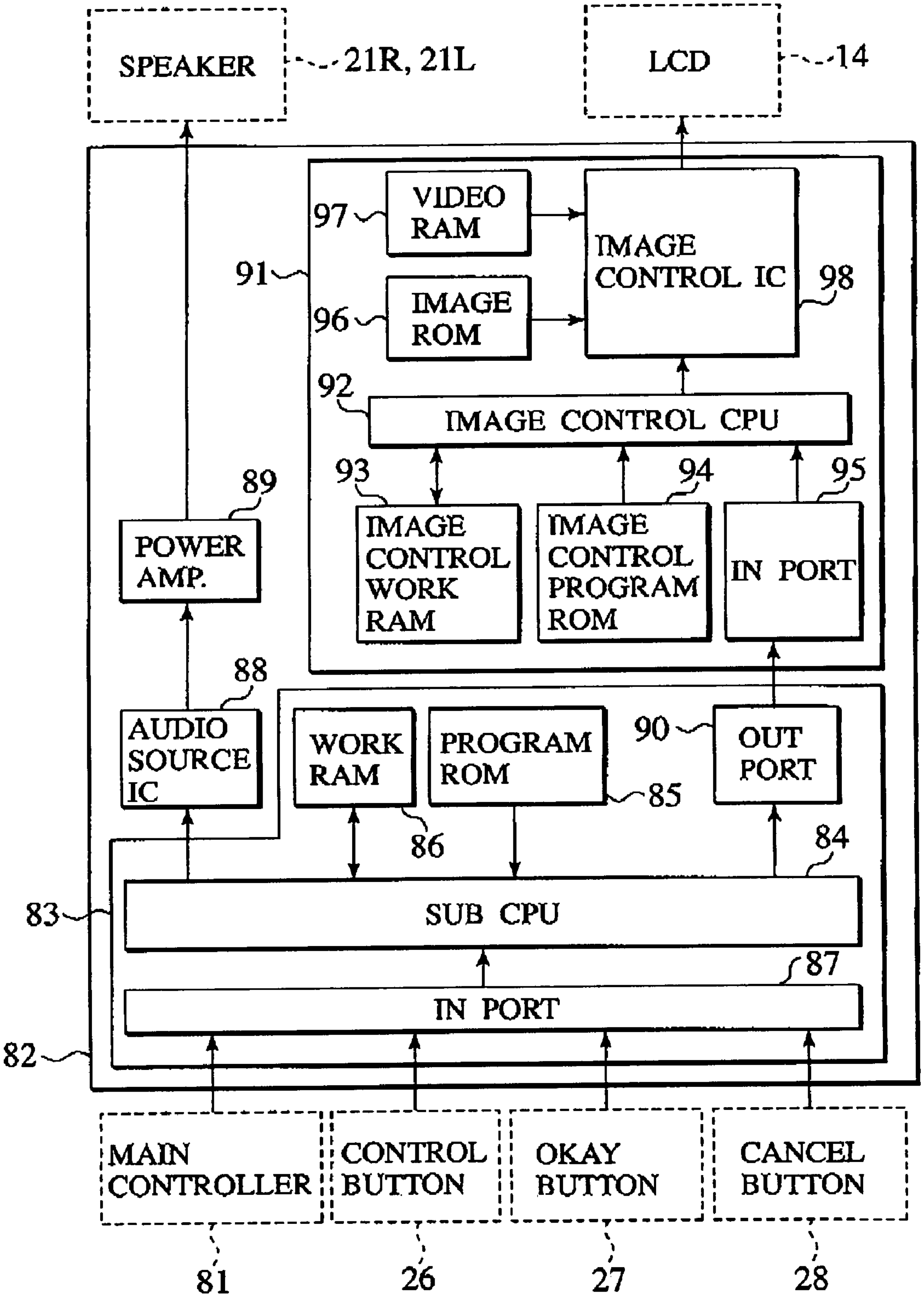
FIG. 5 is a block diagram showing a sub controller of the slot machine according to the embodiment of the present invention.
Figure 20:
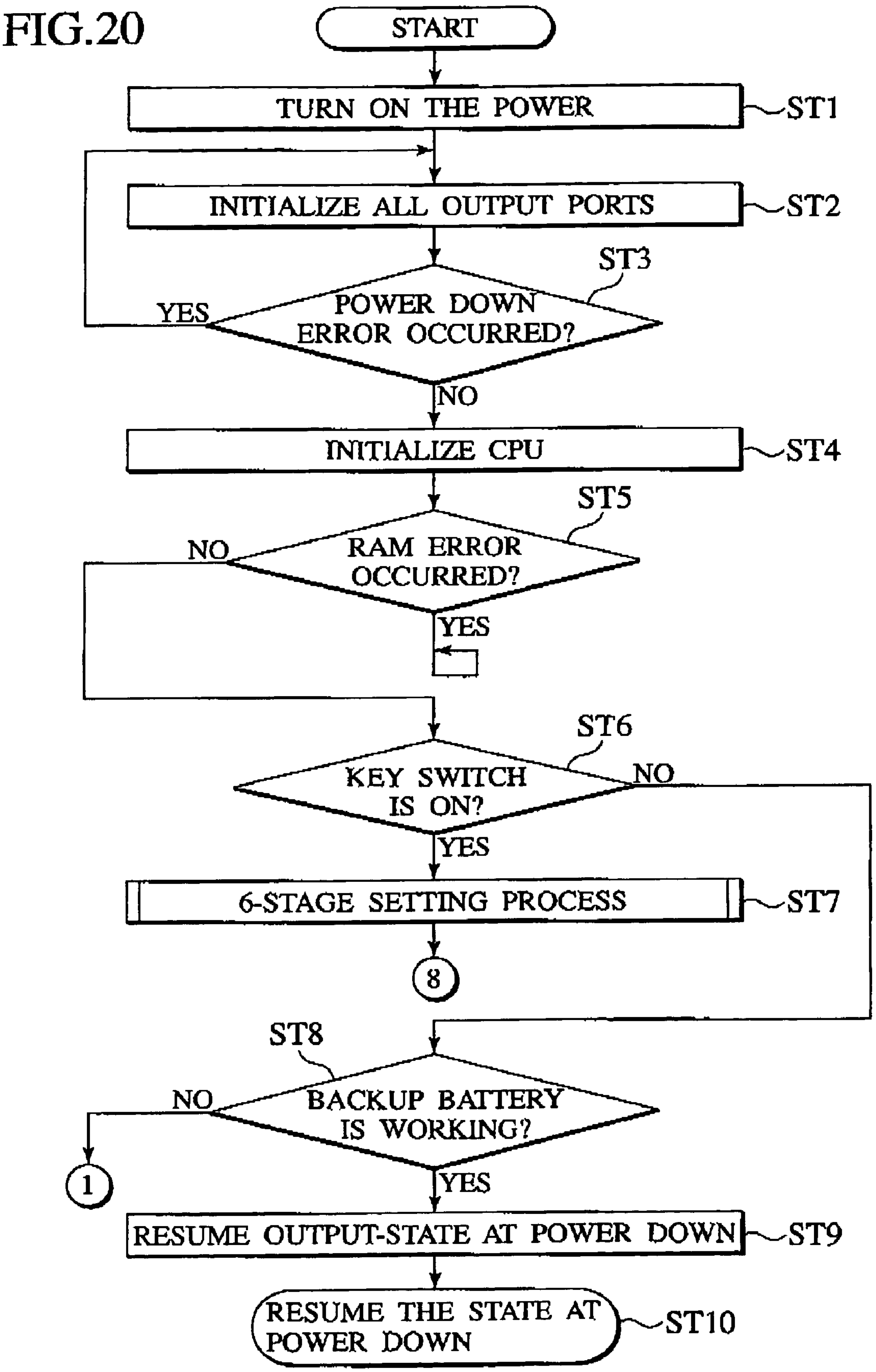
FIG. 20 is a flowchart showing a process of a main controller.
Figure 21:
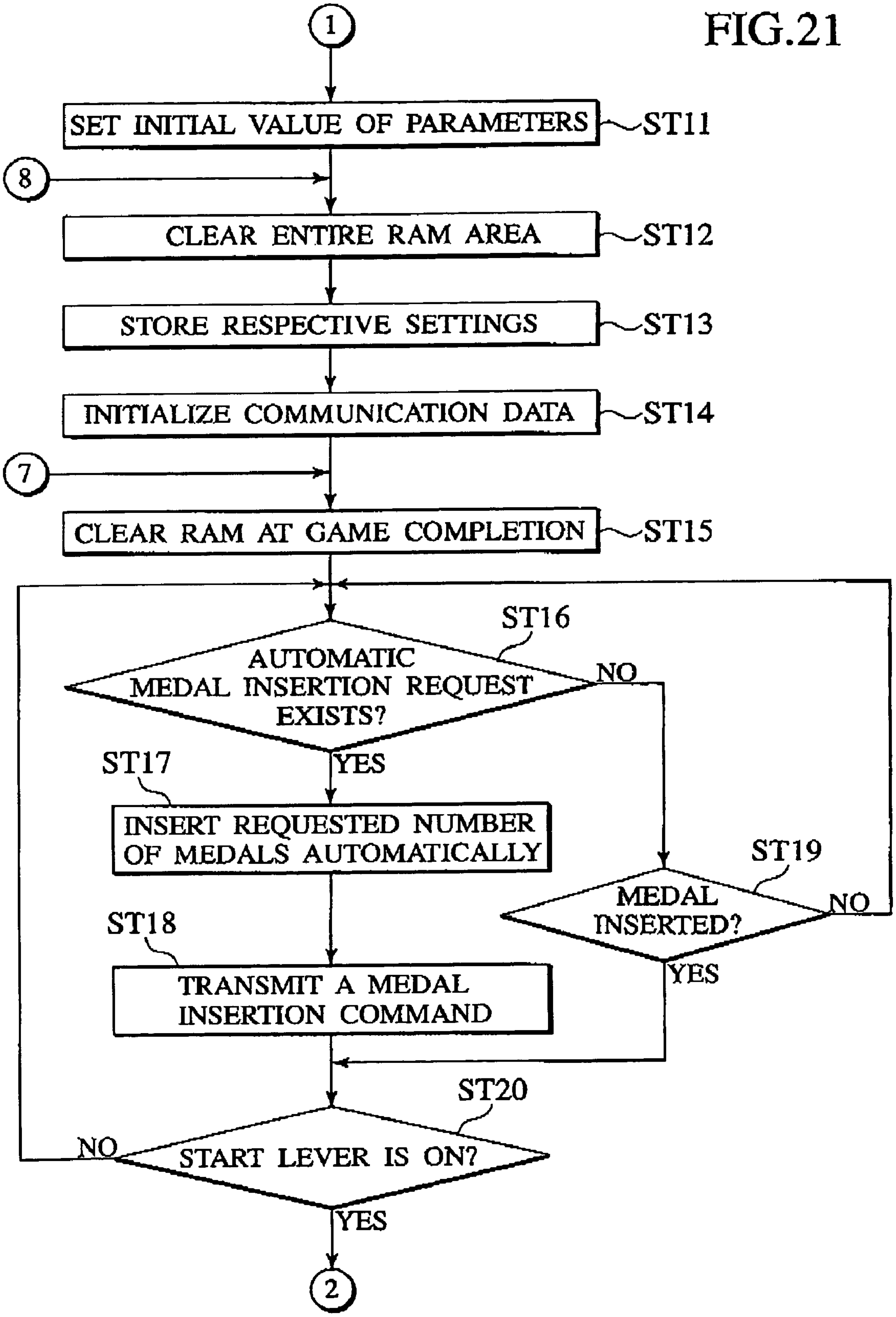
FIG. 21 is a flowchart showing a process of a main controller.
Figure 22:
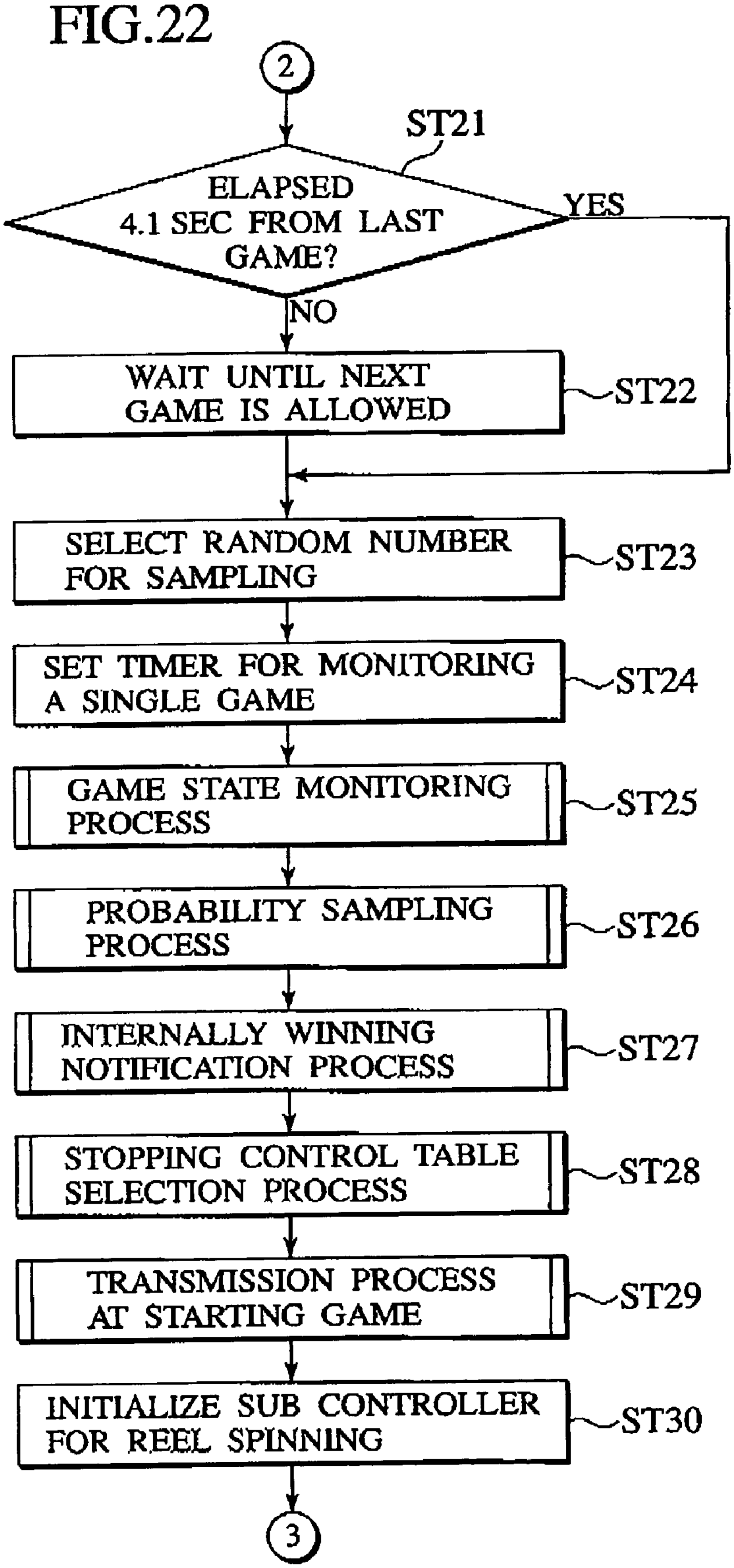
FIG. 22 is a flowchart showing a process of a main controller.
Figure 23:
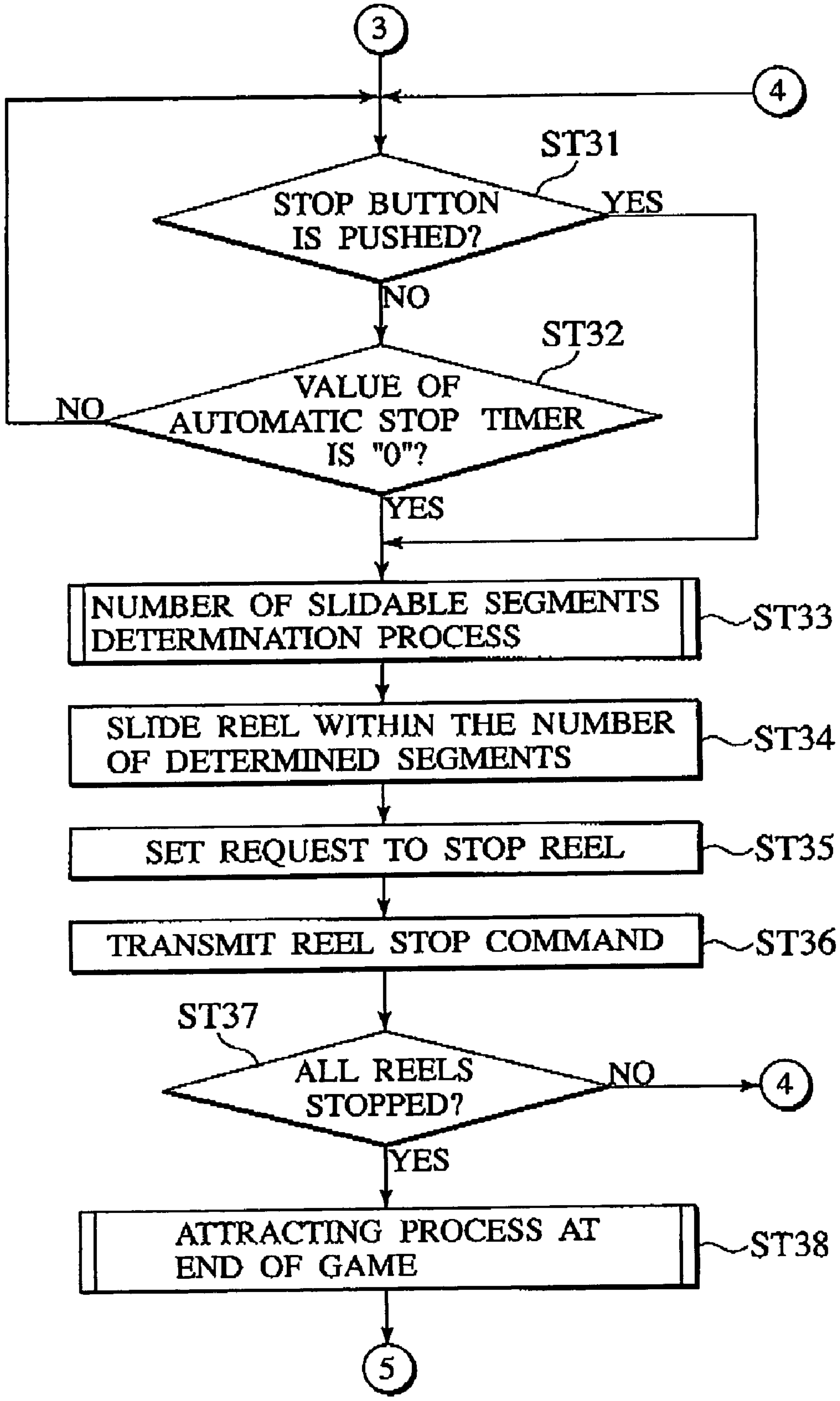
FIG. 23 is a flowchart showing a process of a main controller.
Figure 24:
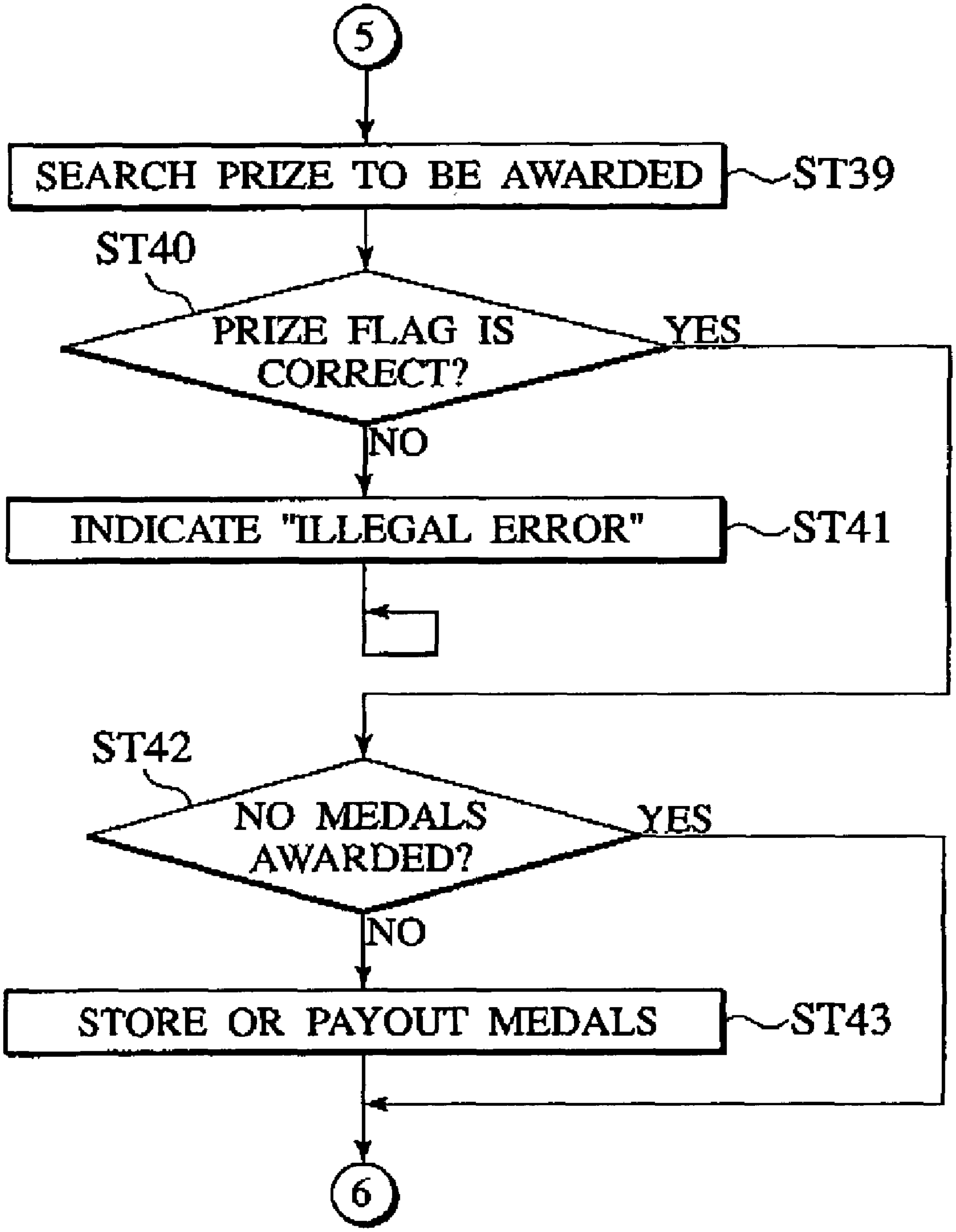
FIG. 24 is a flowchart showing a process of a main controller.
Figure 25:
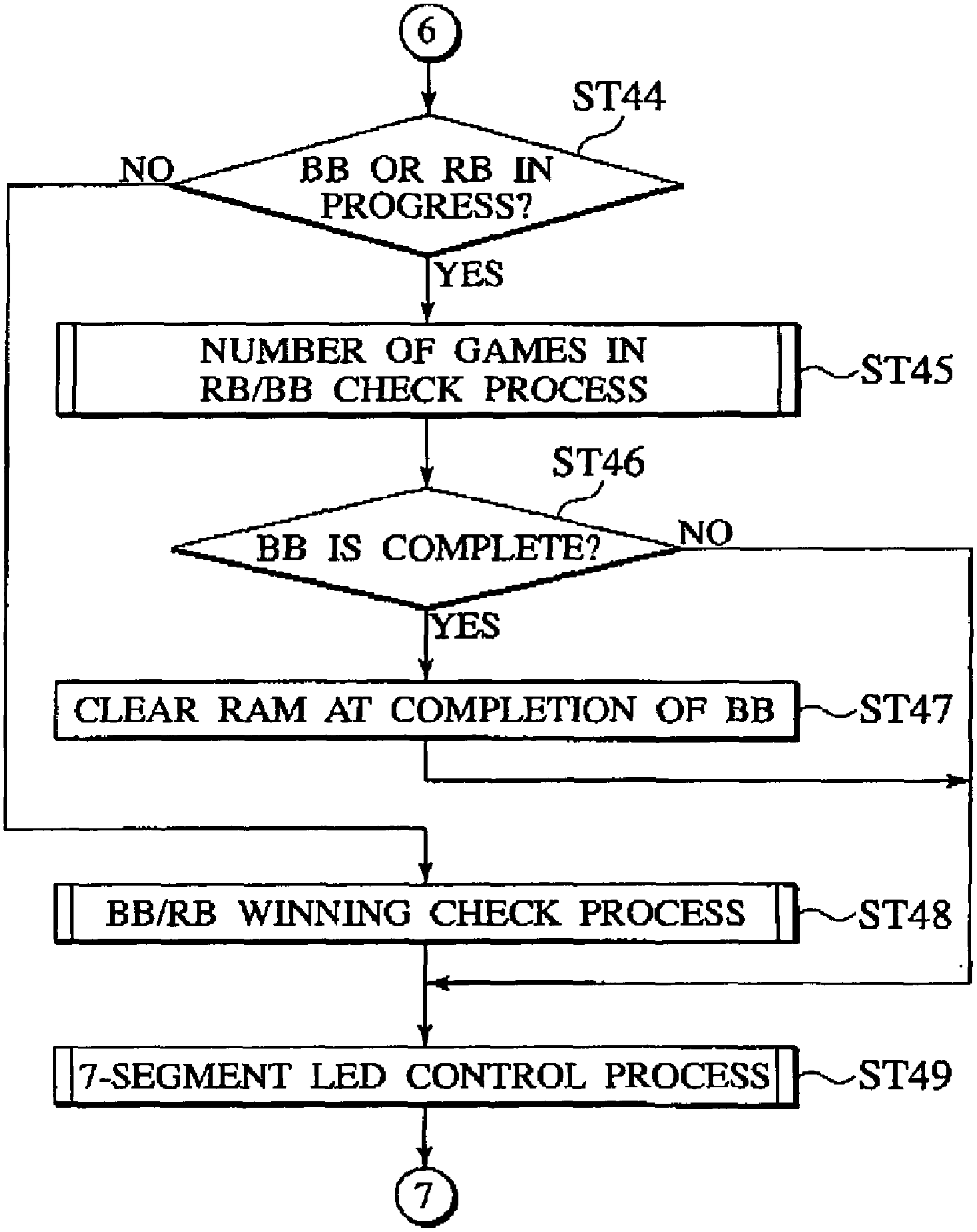
FIG. 25 is a flowchart showing a process of a main controller.

A block diagram in FIG. 5 shows configuration of the sub controller 82. The sub controller 82 controls lighting of the lamps (the 1-BET lamp 9*a*, the 2-BET lamp 9*b*, the MAX-BET lamp 9*c* and the WIN lamp 17), display units (the payouts indicator 18, the credited medal indicator 19 and the bonus game counter 20) and the other various images displayed on the panel display unit 5. The sub controller 82 also controls the sounds outputted from the speakers 21L, 21R.

The sub controller 82 is deployed on a different circuit board from that of the main controller 81 and is mainly configured by a microcomputer 83 (hereinafter referred to as a "sub microcomputer 83"). Specifically, the sub microcomputer 83 is configured with an image control circuit 91 as a display controlling means for the panel display unit 5, a audio source IC 88 for storing audio sour=s outputted by the speakers 21L, 21R and a power amplifier 89.

The sub microcomputer 83 includes a sub CPU 84 for performing controls according to the instructions transmitted by the main controller 81, and a program ROM 85 as well as a work RAM 86 as the storing means. Although, a dock pulse generator, a divider, a random number generator and a sampling circuit are not installed in the sub controller 82, random number sampling is performed on a program running on the sub CPU 84.

The sub microcomputer 83 has a notifications counter and a ceiling-AT quantity stock counter, etc. in a prescribed area of its memory area The notifications counter stores the number of remaining notifications of the order of pushing during the AT (assist-time). If the value of the counter is "1" or more, the ceiling-AT is implemented. The ceiling-AT quantity stock counter stores information regarding the number of remaining AT to be implemented.

The program ROM 85 stores a control program executed on the sub CPU 84. The work RAM 86 is configured as a temporary storing means when the sub CPU 84 executes the control program.

The image control circuit 91 is configured with an image control CPU 92, an image control work RAM 93, an image control program ROM 94, an image ROM 96, a video RAM 97 and an image control IC 98. The image control CPU 92 determines the content to be displayed on the panel display unit 5 according to an image control program stored in the image control program ROM 94 based on the parameters set by the sub microcomputer 83.

The image control program ROM 94 stores the image control program regarding the display on the panel display unit 5 and various tables for selection. The image control work RAM 93 is configured as a temporary storing means when the image control CPU 92 executes the image control program. The image control IC 98 produces an image depending upon the displayed content determined by the image control CPU 92 and outputs the image to the panel display unit 5. The image ROM 96 stores dot data for producing the image. The video RAM 97 is configured as the temporary storing means when the image control IC 98 produces the image.

Next, with reference to FIGS. 10A and 10B, the probability-sampling table will be described.

The probability-sampling tables are referred during a probability sampling process. The table shown in FIG. 10A is used under the normal game state, and the table shown in FIG. 10B is used under the normal game state in BB state. The tables are used to determine the internally winning prize of each game.

Both tables have the range of random numbers from 0 to 16383, and the internally winning prize is determined using one of the values to be sampled from the range.

For example, under the normal game state, if the sampled value of the random number is "2851", the "Bell prize" is determined as the internally winning prize. Further, if the sampled value of the random number is in a range from 11036 to 16383, no prizes are to be awarded for the game.

Hereinafter, with reference to FIGS. 11 through 15, the stopping control table, which is used when the internally winning of the "Bell prize" occurs, will be describes The "stopping control table number selection table" shown in FIG. 11 is used to determine the table to be referred when the spinning reels 3L, 3C, 3R are controlled to stop while the internally winning of the "Bell prize" has occurred. Specifically, if the internally winning of the "Bell prize" occurs, one of the six tables is referred to, and the control for stopping the spinning reels 3L, 3C, 3R is performed based on the selected table.

FIG. 12 shows a relationship between the order of the stopping operation of the spinning reels 3L, 3C, 3R based on the selected table shown in FIG. 11 and winning of the "Bell prize". For example, the table No. 1 is selected based on the "stopping control table number selection table" shown in FIG. 11, the "Bell prize" is awarded if the order of the operation follows "L-C-R". However, the "Bell prize" is not awarded if the order of the operation does not follow the "L-C-R". In other words, it is necessary that the internally winning of the "Bell prize" occurs and the order of the operation for pushing the stop buttons 7L, 7C, 7R follows the order specified by the selected table number.

Here, with reference to FIGS. 13 through 15, a detailed controlling method to stop the spinning reels 3L, 3C, 3R in a case where the internally winning of the "Bell prize" has occurred will be described.

In the stopping control table, the "position when the stop button is pushed" and the "controlled stop position" are indicated using a code number. The "position when the stop button is pushed" means the code number of the symbol positioned on the centerline 8*a* (specifically, the center of the symbol is positioned above the centerline 8*a* and is the closest to the centerline 8*a*) when the stop buttons 7L, 7C, 7R, which correspond to the spinning reels 3L, 3C, 3R, are pushed.

The "controlled stop position" means the code number of the symbol to be displayed on the position of the centerline Sa when the reel stops due to the stopping operation. Here, in the embodiment, four (4) segments are assigned in the maximum for a so-called "slidable segments". For example, if the stop button 7R is pushed at the timing when the "CHERRY", which the code number of "12" is assigned, reaches the position of the centerline 8*a* while the spinning reel 3R is spinning the spinning reel 3R can be controlled so as to stop the "BLUE7", which the code number of "08" is assigned, on the position of the centerline 8*a*.

FIG. 13 shows the stopping control table used for a case where the prize is to be awarded. The table is used when controlling the reel so as to fine up the "BELL-BELL-BELL" along the active line for awarding the "Bell prize" after the internally winning of the "Bell prize" occurred.

In FIG. 13, the "controlled stop position" of the reel 3L is the code number of either "03", "08", "11" "15" or "19", which correspond to the "BELL" symbol. In FIG. 13, the "controlled stop position" of the reel 3C is the code number of either "03", "07", "11", "15" or "19", which correspond to the "BELL" symbol. Similarly, in FIG. 13, the "controlled stop position" of the reel 3R is the code number of either "01", "05", "10", "14" or "18", which correspond to the "BELL" symbol.

As described above, if the stopping control table shown in FIG. 13 is used for controlling the spin reels 3L, 3C, 3R, the "BELL" symbol appears on the position of the centerline 8*a*, i.e., in the middle of the display windows 4L, 4C, 4R, which causes the prize to be awarded.

FIG. 14 shows the stopping control table used for the regular-order pushing and the center-stag pushing in a case where the prize is missed after the internally winning of the "Bell prize" has occurred. The table is used when controlling the reel so as to not line up the "BELL-BELL-BELL" along the active line (the "Bell prize" is not awarded). Here, the controlled stop positions, which correspond to the positions when the stop button of the reel 3L and 3C are pushed, are basically the sane as those shown in FIG. 13.

However, in FIG. 14, the controlled stop position of the real 3R is the code number of either "02", "06", "11", "15" or "19", which corresponds to the "REPLAY".

As described above, if the stopping control table shown in FIG. 14 is used for controlling the spinning reels 3L 3C, 3R, the "BELL" symbols appear in the middle of the display windows 4L and 4C, and the "BELL" symbol appears in the middle of the display window 4R, and it therefore causes the "Bell prize" not to be awarded.

FIG. 15 shows the stopping control table used for the reverse-order pushing and in a case where the prize is missed after the internally winning of the "Bell prize" occurs. The table is used when controlling the reel so as to not line up the "BELL-BELL-BELL" along the active line (the "Bell prize" is not awarded). Here, the controlled stop positions, which correspond to the positions when the stop button of the reel 3C and 3R are pushed, are basically the same as those shown in FIG. 13.

However, in FIG. 15, the controlled stop position of the reel 3L is the code number of either "04", "09", "12", "17" or "20", which corresponds to the "REPLAY".

As described above, if the stopping control table shown in FIG. 15 is used for controlling the spinning reels 3L, 3C, 3R, the "REPLAY" symbol appears in the middle of the display window 4L, and the "BELL" symbols appear in the middle of the display windows 4C and 4R, and it therefore causes the "Bell prize" not to be awarded.

In the embodiment, the six ways are adopted as the order of the stopping operation as described above, and the "BELL-BELL-BELL" lines up along the active line and the prize is then awarded only if the stopping operation is performed according to the order of the operation specified by the selected table number.

Therefore, it is possible that whether lining up of the "BELL-BELL-BELL" occur or not is determined when the second stopping operation is performed. For example, there is a case where the table number "1" (the order of the operation is "L-C-R") shown in FIG. 12 is selected and the stop button 7L is then pushed to stop the reel 3L. It means that there is case whether lining up of the "BELL-BELL-BELL" occurs or not is not yet apparent at the first stopping operation. Because, it is still possible that the operation follows the "L-R-C" instead of "L-C-R", which causes the prize not to be awarded.

Further, in the embodiment, the "BELL-BELL-BELL" always lines up along the centerline 8*a*. In the embodiment, two types of the stopping control tables are thus used for the case where the prize is missed as shown in FIGS. 14 and 15. It is to be noted that if the table No. "2", "3", "4", "5" or "6" is selected, the "Bell prize" is to be awarded by performing the operation following the order of "L-R-C", "C-L-R", "C-R-L", "R-L-C" or "R-C-L", respectively.

FIG. 16A shows a "table for the ceiling-AT quantity selection" and FIG. 16B shows a "table for a ceiling-AT implementation sampling". The ranges of a random number are 0 to 4095 for "table for the ceiling-AT quantity selection", and 0 to 255 for the "table for a ceiling-AT implementation sampling".

Ten (10) games are allowed during the ceiling-AT and the "table for the ceiling-AT quantity selection" determines quantities of the ceiling-AT to be implemented Either "1", "2", "5", "10" or "30" times is selected by sampling.

In the table, the value is subtracted from the sampled random number starting from the upper column one after the other, and if the reminder becomes a negative number, the quantity corresponding to the column is set as the ceiling-AT quantity.

For example, if the sampled random number is "4021", firstly, "2356" shown in the first column is subtracted from "4021" and the remainder becomes "1665". Since the remainder is a positive number, "1512" shown in the second column is further subtracted and the remainder becomes "153". Since the remainder is still a positive number, "196" shown in the third column is further subtracted and the remainder becomes "43". Here, since the remainder becomes a negative number, the AT are set 5 times.

Further, the "table for a ceiling-AT implementation sampling" is used to determine whether or not the ceiling-AT is implemented. Here, if the "implement", which has the value "32", is selected, ten (10) games, in which an image notifying the order of the operation appears, are set. It means the ceiling-AT starts when the "implement" is selected. Incidentally, the method of sampling is the same as the "table for the ceiling-AT quantity selection" described above.

FIG. 17A shows a "table for ceiling start-value selection" and FIG. 17B shows a "table for transition to the ceiling". The range of a random number is 0 to 255 for the "table for ceiling start-value selection", and the value indicated in the "table for transition to the ceiling" means the differences, which are used to determine whether or not the level of the ceiling indicator increases.

Firstly, the "table for ceiling start-value selection" is used after the BB state is completed and determines the value of the difference, which causes the next implementation of the ceiling if the value of "1200" in the table is selected, the ceiling, which is a sort of relieving of the player, is implemented when the difference between consumed medals and paid medals reaches 1200 pieces. Similarly, the ceiling is implemented when the difference reaches 1500 pieces if "1500" is selected, and 1800 pieces if "1800" is selected.

The "table for transition to the ceiling" is used to determine the level to be indicated on the ceiling indicator according to the table for ceiling stat-value selection and the current difference of the medals. Specifically, the level to be indicated is selected by referring the value shown in the table based on the current difference and the selected value (i.e., 1200, 1500 or 1800 pieces) that causes implementation of the ceiling-AT. For example, if the value selected for implementation of the AT is 1200 pieces and the current difference reaches 821 pieces, level 5 is indicated. Further, if the difference reaches 900 pieces, level 6 is indicated.

FIGS. 18 and 19 show lists of commands. These commands are mainly transmitted from the main controller 81 to the sub controller 82. The main controller 81 and the sub controller 82 are connected by 16 data signal lines and a signal line. The commands are configured by 2, 4 or 6 bytes, and are transmitted by a 1, 2 or 3 step sequence.

In case of the start commands, the type of the internally winning prize, the game state and the selected stopping control table number for a case where the is internally winning prize of the "BELL" are transmitted as a single command. The other commands are similar to the start commands. Further, commands shown in FIGS. 18 and 19 are example and the other required information is also transmitted in order for sub controller 82 to perform control.

Hereinafter, with reference to FIGS. 20 to 26, main flowcharts regarding the CPU 41 of the main controller 81 will be described.

Firstly, power is turned on (step 1/hereinafter referred to as "ST.") and the CPU 41 initializes all the output ports (ST2). The CPU 41 then checks whether or not a "power-down error" occurs (ST3). Here, if a "power-down error" occurs, the process of ST2 is again performed. If no "power-down error" occurs, it is shifted to the process of ST4. In ST4, the CPU 41 itself is initialized. The CPU 41 then checks whether or not a "RAM error" has occurred (ST5). Here, if the "RAM error" has occurred, "RAM error" is indicated. Specifically, "rr" is indicated on the payouts indicator 18 that is configured by a seven-segment LED. Incidentally, "RAM error" means that reading and writing using the RAM 43 is not properly working.

If no "RAM error" has occurred, the CPU 41 checks whether or not a key switch 63 for setting is turned on (ST6). If the key switch 63 is turned on, the CPU 41 performs a setting process configured by six stages (ST7) and then shifts to the process of ST12. If the key switch 63 is turned off, the CPU 41 shifts to the process of ST8. In the process of ST8, the CPU 41 checks whether or not a back-up battery works properly. If the back-up battery works properly, the CPU 41 clears addresses and an unused area of the RAM 43, and resumes the output-state when power was turned off (ST9). Further, the CPU 41 updates the input ports to the state when power is turned on, and resumes the state when power was turned off (ST10).

If the back-up battery does not work properly, the CPU 41 sets an initial value of parameters (ST11), and clears the entire area of the RAM 43 (ST12). The processes in ST12 and the followings of ST12 are also performed in a case where the process of ST7 is performed. The CPU 41 stores respective settings (ST13) and initializes communication data (ST14). The CPU 41 then clears a certain area of the RAM 43 when a game is completed (ST15). Further, the CPU 41 checks whether or not a request for automatic medal insertion exists (ST16). The request for automatic medal insertion exists if a replay was acquired at the last game. If the request exists, the CPU 41 automatically inserts the number of requested medals (ST17), transmits a medal insertion command to the sub controller 82 (ST18), and then shifts to the process of ST20. If no request for automatic medal insertion exists, the CPU 41 accepts insertion of medals via the medal insertion slot 22 and the BET switches (ST19), and shifts to the process of ST20.

In the process of ST20, the CPU 41 checks whether or not the start lever 6 is turned, and checks whether or not 4.1 seconds are elapsed from the last game if the start lever 6 is turned (ST21). Specifically, the CPU 41 checks the value of a timer for monitoring a single game, which is set in the process of ST24. If 4.1 seconds are not yet elapsed, the CPU 41 waits until the next game is allowed (ST22) and then shifts to the process of ST23.

In the process of ST23, the CPU 41 selects a random number for sampling. Specifically, the CPU 41 selects a random number in a range from 0 to 16383. The CPU 41 then sets the timer for monitoring a single game (ST24), and performs a game state monitoring process (ST25). Further, the CPU 41 performs a probability sampling process (ST26). In the probability sampling process, the internally winning prize is determined based on the random number selected in ST23 and the probability-sampling table corresponding to the current game state determined in the game state monitoring process. As described above, the probability-sampling table specifies the random numbers, which causes the internally winning to occur for the respective prizes.

The CPU 41 then performs an internally winning notification process (ST27) and a stopping control table selection process (ST28). Further, the CPU 41 transmits the start command to the sub controller 82 as a transmission process when a game starts (ST29) and initializes the sub controller 82 for spinning the reels (ST30).

Further, the CPU 41 checks whether or not the stop buttons 7L, 7C, 7R are pushed (ST31). If the stop button is pushed, the CPU 41 shifts to the process of ST33. On the other hand, if the stop button is not pushed, the CPU 41 shifts to the process of ST32.

In the process of ST32, the CPU 41 checks whether or not the value of an automatic stop timer is "0". If the value is "0", the CPU 41 shifts to the process of ST33. On the other hand, if the value is not "0", the CPU 41 shift to the process of ST31. In the process of ST33, the number of slidable segments is determined based on the request of winnings (i.e., the internally winning prize), the position of the symbol (i.e., the position of the reel when the stopping operation is performed) and the selected stopping control table, etc.

Then, the reel may be additionally rotated according to the number of slidable segments determined in ST33 (ST34). The CPU 41 sets a request to stop the reel (ST35) and transmits a reel stop command to the sub controller 82 (ST36).

Further, the CPU 41 checks whether or not all the reels have stopped (ST37), and then shifts to the process of ST38 if all the reels have stopped. If all the reels have not stopped, the CPU 41 shifts to the process of ST31. Then, an entertaining process, which notifies the end of game using an image and sound, is performed at the end of a game (ST38) and the CPU 41 searches for the prize to be awarded (ST39). Moreover, the CPU 41 checks whether a prize flag is correct or not (ST40) and shifts to the process of ST42 if it is correct. On the other hand, if the prize flag is not correct, an "illegal error" is indicated (ST41).

The CPU 41 then checks whether the number of medals awarded is "0" or not (ST42). Specifically, the CPU 41 checks which prize is awarded (excluding the replay). If the prize is awarded, a certain number of medals are credited or paid out according to the game state (i.e., BB is in progress or RB is in progress) and the prize (ST43).

The CPU 41 then checks whether or not BB or RB is in progress (ST44) and shifts to the process of ST45 if BB or RB is in progress. If BB or RB is not in progress, the CPU 41 shifts to the process of ST48. In the process of ST45, the number of games in BB/RB is checked, and the completion of BB is determined (ST46). If BB is completed, the CPU 41 clears stored data in RAM after transmission of a BB completion command (ST47), and shifts to the process of ST49. In ST46, if BB is not yet completed, the CPU 41 shifts to the process of ST49. Further, in ST44, if BB or RB is not in progress, a BB/RB winning check process is performed (ST48) and then the CPU 41 shifts to the process of ST49. In the process of ST49, the seven segment LED is controlled to indicate the numbers appropriately and then the CPU 41 returns to the process of ST15.

Figure 26:
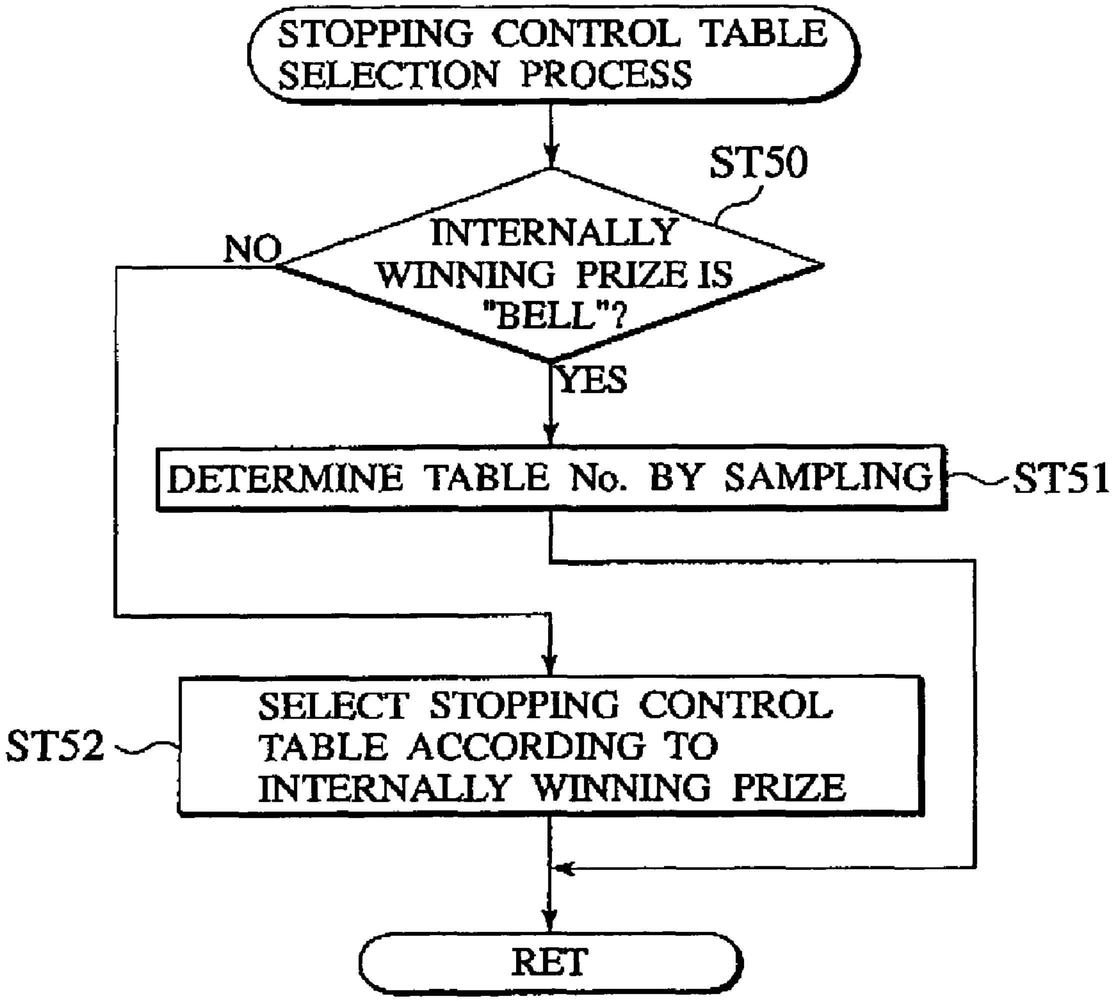
FIG. 26 is a flowchart showing a stopping control table selection process.

Hereinafter, the stopping control table selection process performed in ST28 will be described. As shown in FIG. 26, firstly, the CPU 41 determines whether the internally winning prize is the "Bell prize" or not (ST50). If the internally winning prize is the "Bell prize", the CPU 41 shifts to the process of ST51. On the other hand, if the internally winning prize is not the "Bell prize", the CPU 41 shifts to the process of ST52.

In the process of ST51, a random number is selected and one of the table number is selected based the stopping control table number selection table. Further, in ST52, the stopping control table is selected according to the internally winning prize.

Hereinafter, with reference to FIGS. 27 to 35, the processes regarding the sub controller 82 will be described.

Figure 27:
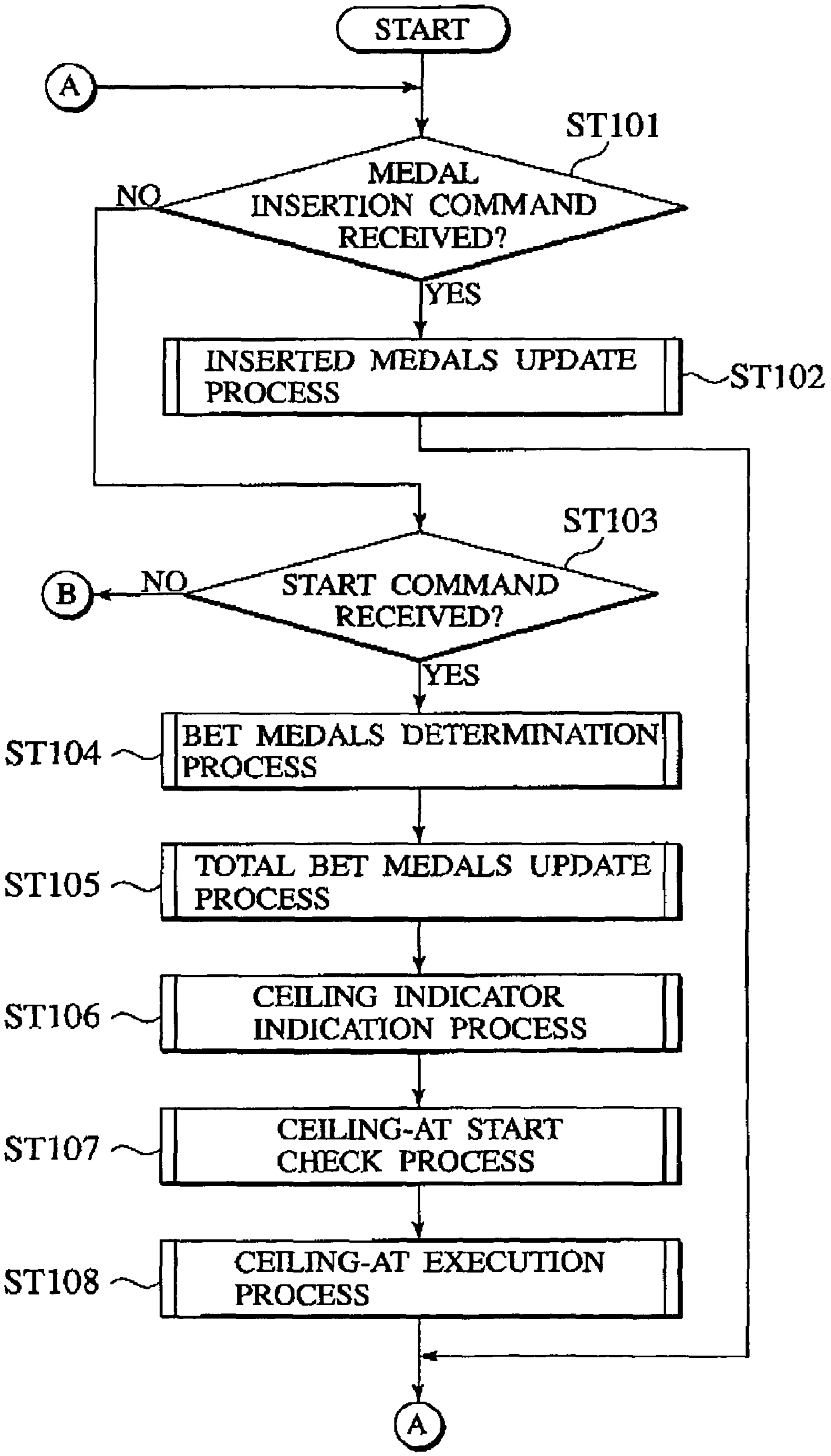
FIG. 27 is a flowchart showing a process of a sub controller.
Figure 28:
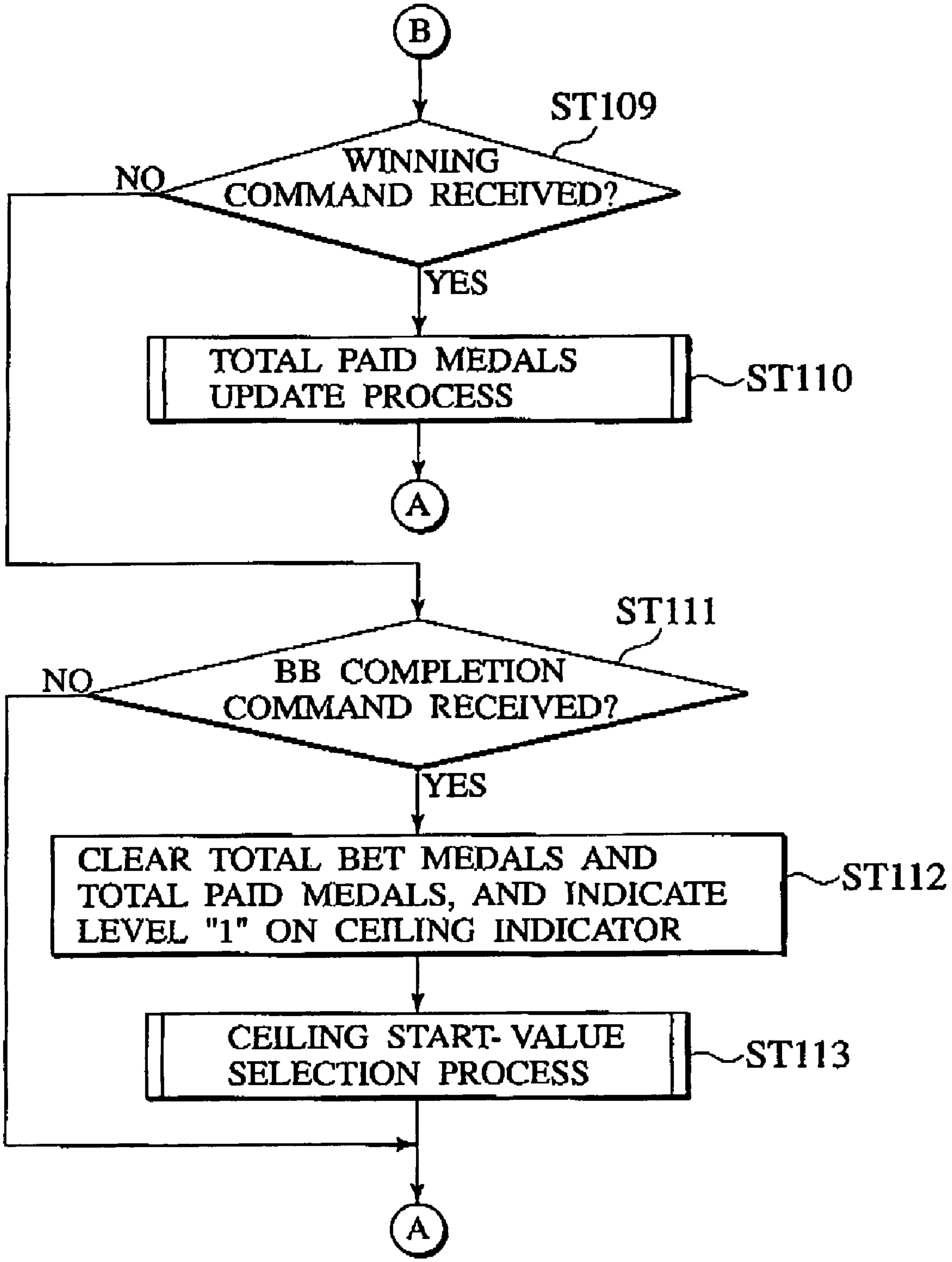
FIG. 28 is a flowchart showing a process of a sub controller.

Firstly, with reference to FIGS. 27 and 28, an outline of the processes performed in the sub controller 82 will be described The sub CPU 84 checks whether a medal insertion command receives, i.e., a medal for a game is inserted, or not (ST101). Here, the medal insertion command includes information indicating the number of inserted medals, etc. If the sub CPU 84 receives the medal insertion command, the sub CPU 84 shifts to the process of ST102. In the process of ST102, the number of inserted medals is updated while the operation of the start lever 6 is accepted. The sub CPU 84 then returns to the process of ST101.

The sub CPU 84 checks reception of the start command, i.e., whether or not a game is started, if the sub CPU 84 has not received the medal insertion command (ST103). If the sub CPU 84 has received the start command, the sub CPU 84 determines the number of bet medals (the game media) for the game (ST104) and updates the total number of bet medals (ST105). Further, the process to indicate the level on the ceiling indicator is performed (ST106). The sub CPU 84 checks and determines whether or not to implement the ceiling-AT (ST107). The sub CPU 84 then performs execution of the ceiling-AT if it was determined in ST107 (ST108), and returns to the process of ST101.

The sub CPU 84 checks reception of the winning command, i.e., whether or not a prescribed winning prize is awarded, if the sub CPU 84 has not received the start command in ST103 (ST109). If the sub CPU 84 has received the winning command, the sub CPU 84 updates the total number of paid medals (ST110). The sub CPU 84 then returns to the process of ST101.

The sub CPU 84 checks reception of the BB completion command, i.e., whether or not BB is completed in the current game, if the sub CPU 84 has not received the winning command in ST109 (ST111). If the sub CPU 84 receives the BB completion command, the sub CPU 84 clears the total number of bet medals and the total number of paid medals stored in the RAM, and then the level "1" is indicated on the ceiling indicator (ST112). Since the total number of bet medals and the total number of paid medals stored in the RAM are cleared, determination to implement the ceiling-AT can be performed starting from completion of BB.

Then, the start-value for the next implementation of the ceiling-AT is determined by a ceiling start-value selection process (ST113). The sub CPU 84 skips the processes of ST112 and ST113, and returns to the process of ST101 if the sub CPU 84 has not received the BB completion command in ST111.

FIGS. 29A through 29D are diagrams explaining the "inserted medals update process" in ST102, the "bet medals determination process" in ST104, the "total bet medals update process" in ST105, and the "total paid medals update process" in ST110, respectively.

Figure 29A:
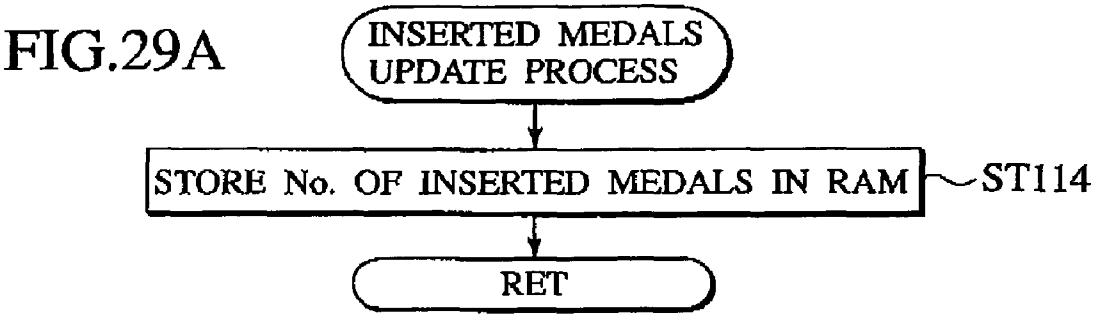
FIG. 29A is a flowchart showing a inserted medals update process.
Figure 29B:
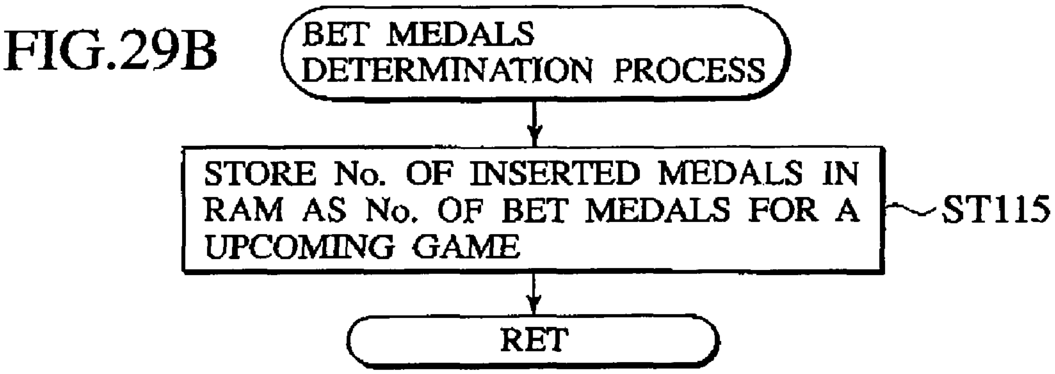
FIG. 29B is a flowchart showing a bet medals determination process.

In the inserted medals update process shown in FIG. 29A, information regarding the number of inserted medals is stored in the RAM temporarily (ST114). In the bet medals determination process shown in FIG. 29B, the number of inserted medals is stored in the RAM at ST114 as the number of bet medals for an upcoming game (ST115). As described above, the number of inserted medals is observed in the inserted medals update process, and the number of bet medals is determined after the reception of the start command. Because the number of inserted medals can be changed using the 1-BET switch 11, the 2-BET switch 12 or the MAX-BET switch 13 until the start lever 6 is operated, it is necessary to determine the number of bet medals when the start lever 6 is operated.

Figure 29C:
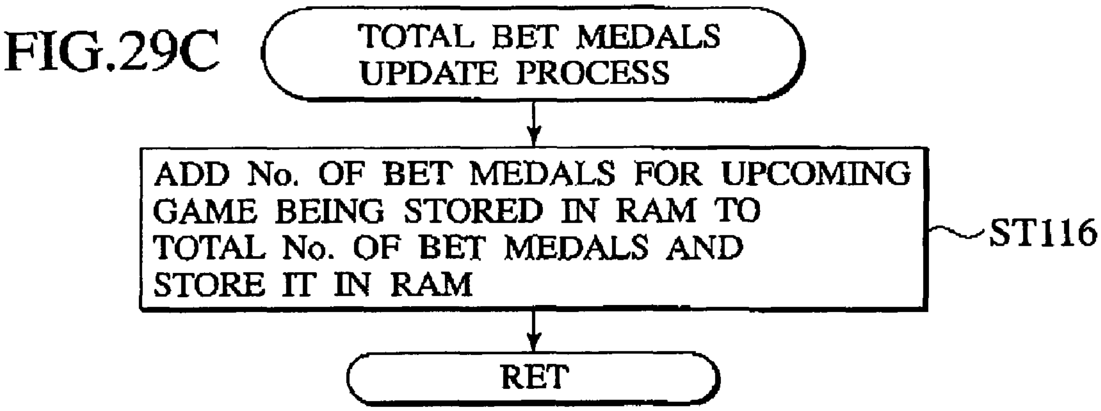
FIG. 29C is a flowchart showing a total bet medals update process.
Figure 29D:
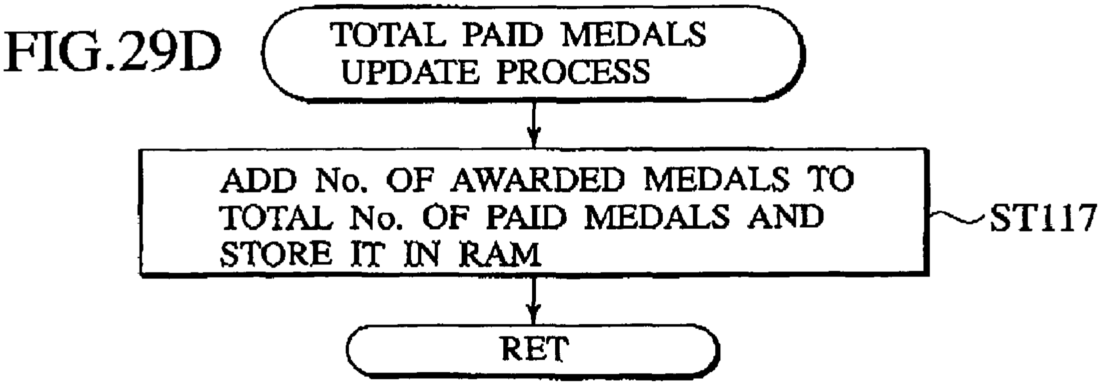
FIG. 29D is a flowchart showing a total paid update process.

In the total bet medals update process in FIG. 29C, the number of bet medals determined in ST115 for the upcoming game being stored in the RAM is added to the total number of bet medals (ST116). For example, if three medals are bet in the game, "3" is added to the total number of bet medals accordingly. The total number of bet medals can be counted by performing the process every game. In the total paid medals update process in FIG. 29D, the number of paid medals is added to the total number of paid medals if the medals are paid out (ST117). For example, "6" is added if the "Plum prize" is awarded, and "0" is added if no prizes are awarded. The total number of paid medals can be counted by performing the process every game.

Figure 30:
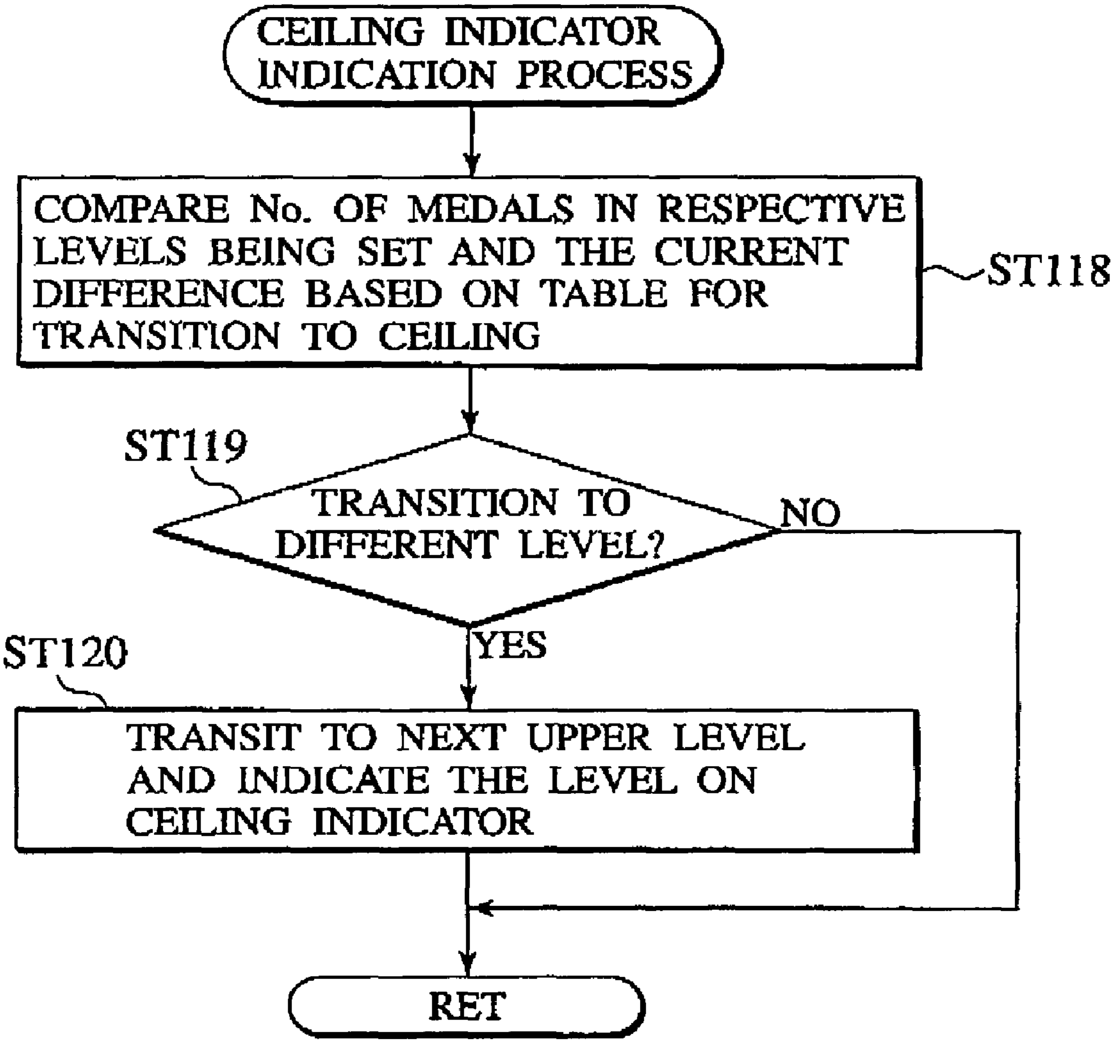
FIG. 30 is a flowchart showing a ceiling indicator indication process.

FIG. 30 shows the ceiling indicator indication process of ST106. In the process, firstly, the number of medals in the respective levels of the ceiling being set, and the current difference between the number of consumed medals and the number of paid medals arc compared based on the table for transition to the ceiling (ST118). Then, whether the level currently indicated is transferred or not is determined (ST119). The level is transferred to the next upper level and the level is indicated on the ceiling indicator as the result of the process in ST119 (ST120). On the other hand, if the level is not transferred as the result of ST119, the process is returned to ST118.

Figure 31:
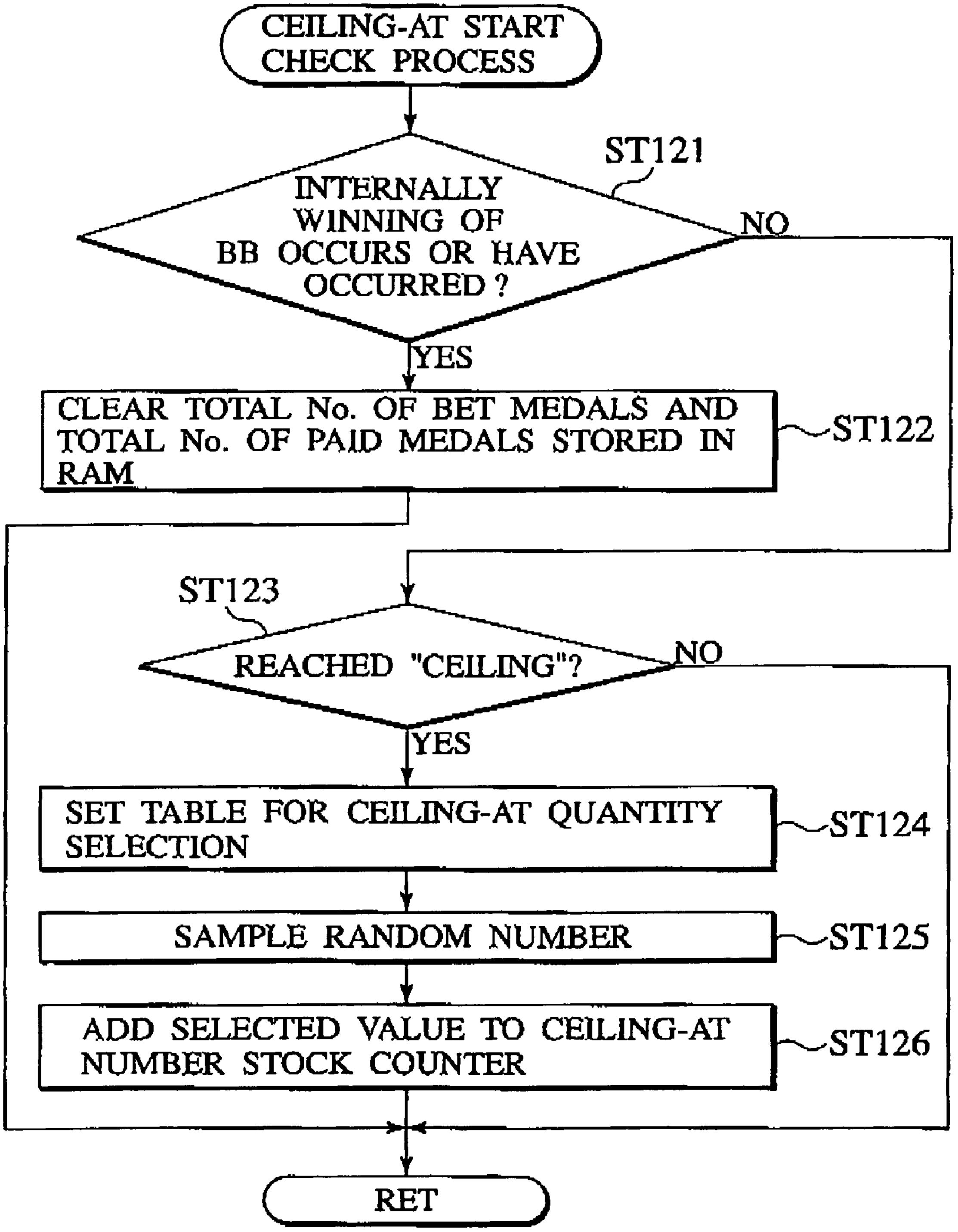
FIG. 31 is a flowchart showing a ceiling-AT start check process.

FIG. 31 shows the ceiling-AT start check process of ST 107. The ceiling-AT means that the "stopping operation assist-time (A)", which is implemented to relieve the player. The ceiling-AT is implemented if the difference between the number of consumed medals and the number of paid medals reaches a prescribed value, and it is so-called "ceiling". Incidentally, the prescribed value is determined in the ceiling start-value selection process performed after completion of BR, and the value is 1200, 1500 or 1800.

In the process, it is firstly checked that the internally winning of BB occurs or it has occurred (ST121). If that is the case, the total number of bet medals and the total number of paid medals are cleared (ST122). The ceiling-AT is not therefore implemented until BB is completed once the internally winning of BB occurs.

If neither the internally winning of BB occurs nor it has occurred, it is checked whether or not the current difference reaches the value of the ceiling being set (ST123). Here, if the difference reaches the value of the ceiling, the table for the ceiling-AT quantity selection is set (ST124), and a random number is sampled (ST125). Then the sampled random number is added to the ceiling-AT quantity stock counter (ST126). In ST123, if the difference is smaller than the value of the ceiling, the process is returned to ST121.

Figure 32:
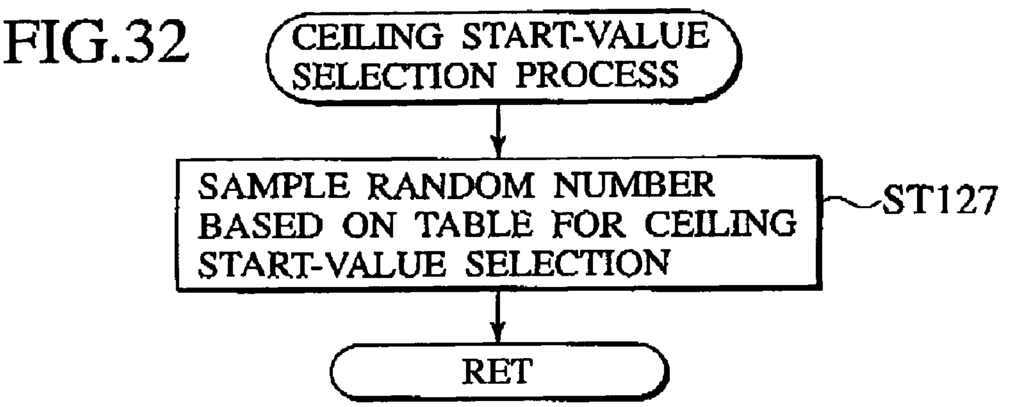
FIG. 32 is a flowchart showing a ceiling start-value selection process.

FIG. 32 shows the ceiling start-value selection process of ST 113. The process is performed after BB is completed, and the number of medals for implementation of the next ceiling-AT is determined. In the process, a random number is sampled based on the table for ceiling start-value selection so as to select the value of 1200, 1500 or 1800 (ST127). The selected value is stored in the RAM until the new value of the ceiling is selected after the completion of BB. As described above, since the different value of the ceiling is selected in the process, the value of the ceiling varies whereby the player is not able to easily recognize when the next ceiling-AT is implemented.

Figure 33:
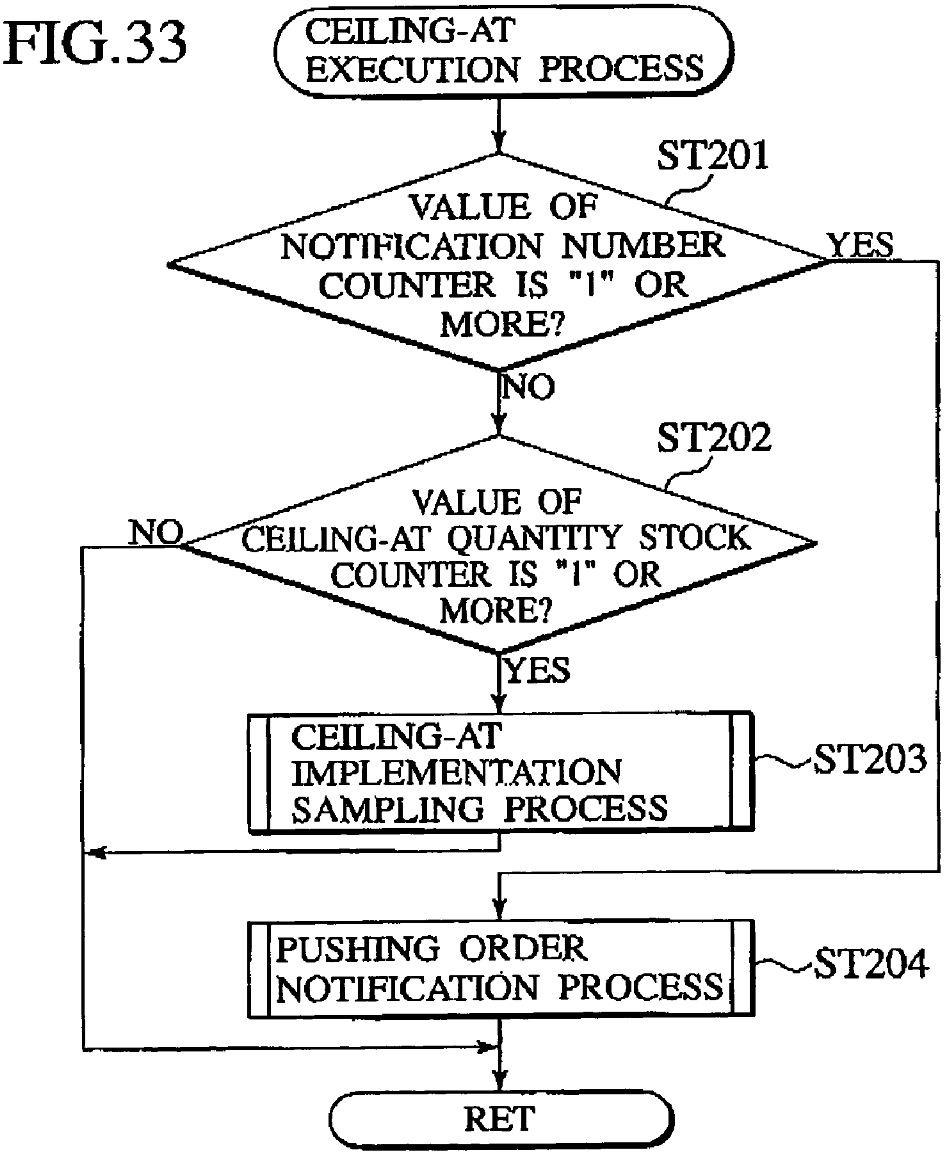
FIG. 33 is a flowchart showing a ceiling-AT execution process.

FIG. 33 shows the ceiling-AT execution process of ST108. In the process, it is checked that the value of the notifications counter is "1" or more (ST201). If the value is "1" or more, a pushing order notification process is performed to notify the player of the order of pushing the stop buttons (ST204). If the value is less than "1", it is checked that the value of the ceiling-AT quantity stock counter is "1" or more (ST202). If the value of the ceiling-AT quantity stock counter is "1" or more, a ceiling-AT implementation sampling process is performed to determine the number of ceiling to be implemented (ST203).

It means that the ceiling-AT is in progress if the value of the notification counter is "1" or more. Further, it means that the ceiling-AT which is being stocked, i.e., the ceiling-AT to be implemented, exists if the value of the ceiling-AT quantity stock counter is "1" or more.

Figure 34:
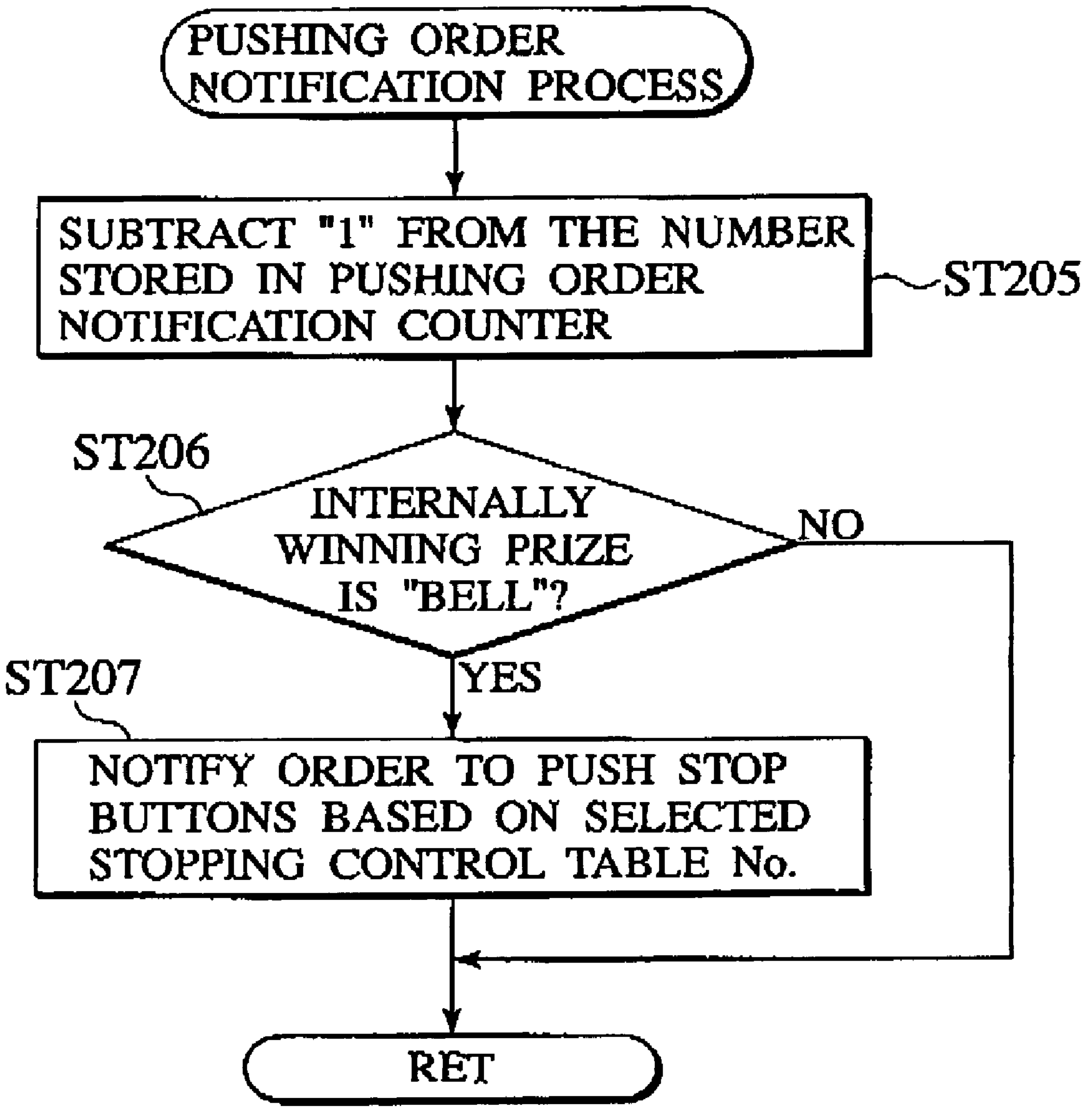
FIG. 34 is a flowchart showing a pushing order notification process.

FIG. 34 shows the pushing order notification process of ST204. Firstly, "1" is subtracted from the number stored in a pushing order notification counter (ST205).

Then, it is checked whether the internally winning prize is the "Bell prize" or not (ST206). If the internally winning prize is the "Bell prize", information, which makes the player win the "Bell prize", is notified based on the selected stopping control table number (ST207), and the process then returns to ST205.

Figure 35:
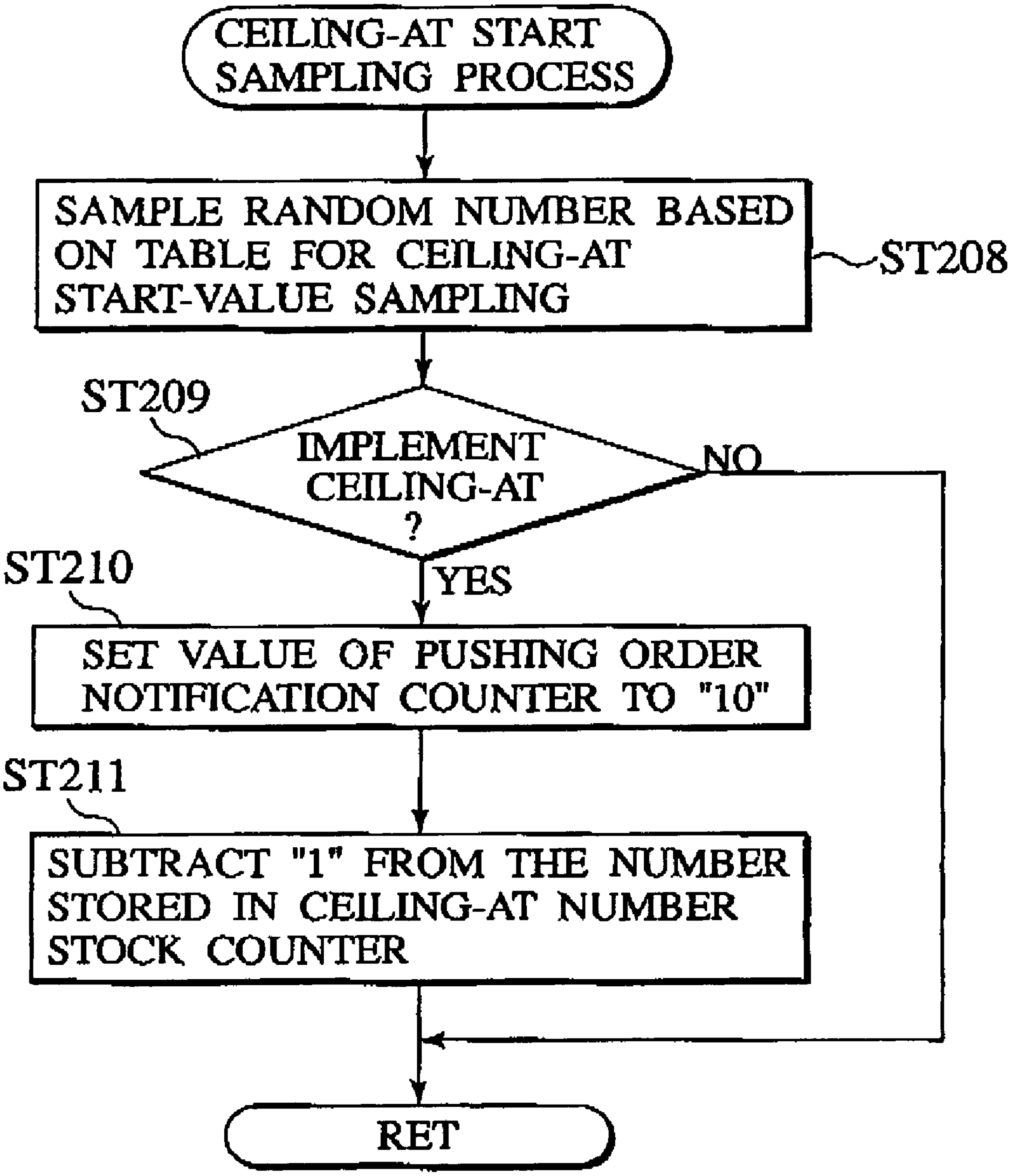
FIG. 35 is a flowchart showing a ceiling-AT implementation sampling process.

FIG. 35 shows the ceiling-AT implementation sampling process of ST203. Firstly, a random number is sampled based on the table for a ceiling-AT implementation sampling (ST208). As the result, it is checked whether the ceiling-AT is implemented or not (ST209). If the implementation of the ceiling-AT is determined, "10" is added to the pushing order notification counter (ST210) and "1" is subtracted from the ceiling-AT quantity stock counter (ST211). The process then returns to ST208.

The invention has been described in detail by referring to the embodiments. It is obvious to those skilled in art that the invention is not restricted to the embodiments mentioned above. In the embodiment, although, the total number of paid medals and the total number of bet medals are cleared when the internally winning of BB occurs, BB is in progress or BB is awarded, the timing to dear those numbers can be arbitrarily set and it is also possible that those numbers are not cleared.

Further, although the stopping operation assist-time (AT) is always implemented when the difference between consumed medals and paid medals reaches a prescribed value in the embodiment, a prescribe number of such relieving may be adopted (only once, for example) for the gaming apparatus 1.

Moreover, in the embodiment, the order of the operation of the stop buttons, which is required to win the prize, is notified in the AT, but an AT that notifies the internally winning prize can also be adopted. Further, in order to provide an advantageous situation for the player, BB or RB may also be adopted besides the AT, in which the player may earn plenty of the game token.

The present invention can be applied to the other gaming apparatus besides the pachi-slo gaming apparatus of the embodiment, e.g., a pachinko gaming apparatus and a slot machine for casinos. Normally, such slot machines are configured without a stop button and arc featured so that the reels start spinning by activation of a start lever or a start button and stop automatically after a prescribed time elapsed. Further, in lieu of payout in coin or medal, it is possible that the slot machine is featured to store information regarding the equivalent value of a game into a ticket or a card.

As described heretofore, according to the present invention, since the front side displaying unit does not display any objects on an area for enabling viewing of the symbols displayed by the variable display unit, both the symbols displayed by the variable display unit and the images for entertainment, etc. are clearly displayed. This means that not only the images for entertainment displayed by the front display unit but also the symbols displayed by the variable display unit are easily viewed by a player of the gaming apparatus so that the player can be entertained.

What is claimed is:

1. A gaming apparatus comprising:

a variable display unit configured to variably display a plurality of symbols;

a front side display unit located in front of the variable display unit, the front side display unit having a first area for enabling viewing of symbols displayed by the variable display unit and a second area, which surrounds the first area, for enabling displaying images thereon;

a backlight set in an end portion of the front side display unit to light up the symbols displayed by the variable display unit and to light up the front side display unit;

a reflecting cover set in the end portion of the front side display unit and configured to allow light emitted from the backlight to directly illuminate the symbols displayed by the variable display unit, the reflecting cover including one end connected to the end portion of the front side display unit and an unconnected free end;

an internally winning prize determiner configured to determine an internally winning prize; and a stopping controller configured to stop the varying of display of the variable display unit based on a result of determination by the internally winning prize determiner;

wherein the front side displaying unit does not display any images on the first area, and a prize is awarded if a stopped state displayed on the variable display unit, which is caused by the stopping controller, matches a prescribed stopped state.

2. A gaming apparatus according to claim 1, wherein the front area has an opening area where the symbols displayed by the variable display unit are to be seen.

3. A gaming apparatus according to claim 1, further comprising a plurality of stoppers configured to stop the varying of display of the variable display unit.

4. A gaming apparatus comprising:

a variable display unit configured to variably display a plurality of symbols; and a front side display unit located in front of the variable display unit, the front side display unit having a first area for enabling viewing of symbols displayed by the variable display unit and a second area, which surrounds the first area, for enabling displaying images thereon;

a backlight set in an e nd portion of the front side display unit to light up the symbols displayed by the variable display unit and to light up the front side display unit;

a reflecting cover set in the end portion of the front side display unit and configured to allow light emitted from the backlight to directly illuminate the symbols displayed by the variable display unit, the reflecting cover including one end connected to the end portion of the front side display unit and an unconnected free end, wherein the front side displaying unit does not display any images on the first area, and a prize is awarded if a combination of stopped symbols displayed on the variable display unit matches a winning combination.

5. A gaming apparatus according to claim 4, wherein the first area has an opening area where the symbols displayed by the variable display unit are to be seen.

6. A gaming apparatus according to claim 4, wherein the second area has an LCD panel.

7. A gaming apparatus according to claim 4, wherein the front side display unit has a protecting glass configured to protect the first area and the second area.

8. A gaming apparatus according to claim 4, wherein the front side display unit has a light guiding panel configured to allow light emitted from the backlight to illuminate the second area.

9. A gaming apparatus according to claim 8, wherein the front side display unit has a scattering panel configured to scatter light emitted from the backlight toward the light guiding panel.

10. A gaming apparatus comprising:

a variable display unit configured to variably display a plurality of symbols; and a front side display unit located in front of the variable display unit, the front side display unit including a LCD panel, which has an opening area for enabling viewing of symbols displayed by the variable display unit and an image display area, which surrounds the opening area, for enabling displaying of images thereon;

a backlight set in an end portion of the front side display unit to light up the symbols displayed by the variable display unit and to light up the front side display unit;

a reflecting cover set in the end portion of the front side display unit and configured to allow light emitted from the backlight to directly illuminate the symbols displayed by the variable display unit, the reflecting cover including one end connected to the end portion of the front side display unit and an unconnected free end, wherein a prize is awarded if a combination of stopped symbols displayed on the variable display unit matches a winning combination.

* * * * *